United States Patent
Aiba et al.

(10) Patent No.: US 11,228,412 B2
(45) Date of Patent: *Jan. 18, 2022

(54) TERMINAL DEVICE, BASE STATION DEVICE, COMMUNICATION METHOD, AND INTEGRATED CIRCUIT FOR PROCESSING DEMODULATION REFERENCE SIGNALS

(71) Applicant: SHARP KABUSHIKI KAISHA, Sakai (JP)

(72) Inventors: Tatsushi Aiba, Sakai (JP); Shoichi Suzuki, Sakai (JP); Kimihiko Imamura, Sakai (JP); Wataru Ouchi, Sakai (JP); Kazunari Yokomakura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/001,197

(22) Filed: Aug. 24, 2020

(65) Prior Publication Data

US 2020/0389273 A1 Dec. 10, 2020

Related U.S. Application Data

(63) Continuation of application No. 16/279,886, filed on Feb. 19, 2019, now Pat. No. 10,797,844, which is a (Continued)

(30) Foreign Application Priority Data

Mar. 14, 2012 (JP) ................................. 2012-056899

(51) Int. Cl.
*H04W 4/00* (2018.01)
*H04L 5/00* (2006.01)
(Continued)

(52) U.S. Cl.
CPC .......... *H04L 5/0051* (2013.01); *H04L 1/0057* (2013.01); *H04L 1/0072* (2013.01);
(Continued)

(58) Field of Classification Search
CPC ..... H04L 5/0051; H04L 1/0057; H04L 5/001; H04L 5/0048; H04L 5/0073;
(Continued)

(56) References Cited

U.S. PATENT DOCUMENTS

2010/0034161 A1 2/2010 Luo et al.
2010/0215011 A1 8/2010 Pan et al.
(Continued)

FOREIGN PATENT DOCUMENTS

JP 2011-250139 A 12/2011
JP 2013-81055 A 5/2013

OTHER PUBLICATIONS

3GPP TS 36. 211 V10.4.0 (Dec. 2011) 3rd Generation Partnership Project; Technical Specification Group Radio Access Network; Evolved Universal Terrestrial Radio Access (E-UTRA); Physical Channels and Modulation (Release 10), pp. 27-39, 97-98.
(Continued)

*Primary Examiner* — Abdelnabi O Musa
(74) *Attorney, Agent, or Firm* — Birch, Stewart, Kolasch & Birch, LLP

(57) ABSTRACT

There are provided a terminal device, a base station device, and an integrated circuit that enable a base station device and a terminal device to determine parameters related to uplink signals or uplink reference signals and to perform efficient communication. A terminal device that transmits a demodulation reference signal associated with a physical uplink shared channel to a base station device includes determining a sequence group number on the basis of a value of a parameter configured by a higher layer, determining the
(Continued)

sequence group number on the basis of a physical layer cell identity, and generating a sequence of the demodulation reference signal on the basis of the sequence group number, wherein the sequence group number is determined on the basis of the physical layer cell identity in a case where a transmission on the physical uplink shared channel corresponding to a downlink control information format to which CRC parity bits scrambled by a Temporary C-RNTI are attached is performed in a random access procedure.

6 Claims, 4 Drawing Sheets

Related U.S. Application Data continuation of application No. 15/965,356, filed on Apr. 27, 2018, now Pat. No. 10,225,058, which is a continuation of application No. 15/412,787, filed on Jan. 23, 2017, now Pat. No. 9,985,764, which is a continuation of application No. 15/259,830, filed on Sep. 8, 2016, now Pat. No. 9,590,785, which is a continuation of application No. 14/384,263, filed as application No. PCT/JP2013/057009 on Mar. 13, 2013, now Pat. No. 9,479,311.

(51) Int. Cl.
| | |
|---|---|
| H04L 27/26 | (2006.01) |
| H04L 1/00 | (2006.01) |
| H04L 1/18 | (2006.01) |
| H04W 24/02 | (2009.01) |
| H04W 74/08 | (2009.01) |
| H04W 88/08 | (2009.01) |

(52) U.S. Cl.
CPC ............ *H04L 1/1812* (2013.01); *H04L 5/001* (2013.01); *H04L 5/0035* (2013.01); *H04L 5/0048* (2013.01); *H04L 5/0053* (2013.01); *H04L 5/0073* (2013.01); *H04L 27/2613* (2013.01); *H04W 24/02* (2013.01); *H04W 74/08* (2013.01); *H04W 74/0833* (2013.01); *H04W 88/08* (2013.01)

(58) Field of Classification Search
CPC .. H04L 27/2613; H04W 24/02; H04W 74/08; H04W 74/0833; H04W 88/08
See application file for complete search history.

(56) References Cited

U.S. PATENT DOCUMENTS

| | | | | |
|---|---|---|---|---|
| 2011/0064042 | A1* | 3/2011 | Kim | H04L 5/0094 370/329 |
| 2011/0085503 | A1 | 4/2011 | Nam et al. | |
| 2011/0249641 | A1 | 10/2011 | Kwon et al. | |
| 2013/0034064 | A1* | 2/2013 | Nam | H04L 5/0091 370/329 |
| 2013/0039284 | A1 | 2/2013 | Marinier et al. | |
| 2013/0114523 | A1 | 5/2013 | Chatterjee et al. | |
| 2013/0148593 | A1 | 6/2013 | Suzuki et al. | |
| 2014/0247799 | A1 | 9/2014 | Suzuki et al. | |
| 2015/0063234 | A1* | 3/2015 | Park | H04L 5/0035 370/329 |
| 2015/0131566 | A1* | 5/2015 | Seo | H04B 1/3838 370/329 |
| 2015/0139165 | A1* | 5/2015 | Noh | H04W 72/042 370/329 |

OTHER PUBLICATIONS

Huawei et al., "Way Forward on PUSCH DMRS," 3GPP TSG RAN WG1 #67, R1-114419, San Francisco, USA, Nov. 14-18, 2011, Agenda item: 7.4.5.1, 2 pages.
Panasonic, "UE-specific base sequence assignment for UL CoMP," 3GPP TSG-RAN WG1 # 68, R1-120229, Feb. 6-10, 2012, pp. 1-5.
Panasonic, "Uplink DMRS sequence for RACH procedure," 3GPP TSG-RAN WG1 Meeting 65, R1-111583, Barcelona, Spain, May 9-13, 2011 (downloaded by EPO on May 3, 2011), XP50491230, pp. 1-3.
Sharp, "DMRS enhancements for UL CoMP," 3GPP TSG RAN WG1 Meeting #68, R1-120277, Feb. 6-10, 2012, pp. 1-7.
"LTE; Evolved Universal Terrestrial Radio Access (E-UTRA); Physical channels and modulation (3GPP TS 36.211 version 11.0.0 Release 11)", Technical Specification, European Telecommunications Standards Institute (ETSI); F-06921; vol. 3GPP RAN 1, No. V11.0.0, 1 (Oct. 1, 2012), XP014075763.
Catt: "Further details on UE-specific UL DMRS", 3GPP Draft; R1-120106, 3rd Generation Partnership Project (3GPP), Mobile Competence Centre; F-06921; vol. RAN WGI, No. Dresden, Germany; Feb. 6, 2012-Feb. 10, 2012, (Jan. 31, 2012), XP050562686, [retrieved on Jan. 31, 2012].
Catt: "UE-specific DM-RS configuration", 3GPP Draft; RI-120102, 3rd Generation Partnership Project (3GPP), Mobile Competence Centre; F-06921; FR., vol. RAN WG 1, No. Dresden, Germany; Feb. 6, 2012-Feb. 10, 2012, (Jan. 31, 2012 ),XP050562682, [retrieved on Jan. 31, 2012].
Ericsson et al: "Details on UL DMRS", 3GPP Draft; R1-120882 UL DMRS, (3GPP), Mobile Competence Centre; 650, Route Des Lucioles: F-06921 ; France, vol. RAN WG1, No. Dresden, Germany; Meeting #68 Feb. 6, 2012-Feb. 10, 2012, XP050563371, [retrieved on Feb. 13, 2012].
Final Office Action issued in corresponding U.S. Appl. No. 16/279,886 dated Feb. 28, 2020.
International Search Report (Form PCT/ISA/210), dated Jun. 18, 2013, for International Application No. PCT/JP2013/057010, with an English translation.
International Search Report (Form PCT/ISA/210), dated Jun. 18, 2013, for International Application No. PCT/JP2013/057012, with an English translation.
Non-Final Office Action issued in corresponding U.S. Appl. No. 16/279,886 dated Oct. 30, 2019.
Notice of Allowance issued in copending U.S. Appl. No. 15/365,356 dated Oct. 24, 2018.
Notice of Allowance issued in corresponding U.S. Appl. No. 16/279,886 dated Jun. 10, 2020.
Qualcomm Europe: "Non-binary hashing functions", 3GPP Draft; R1-081665, vol. RAN WG1, No. Shenzhen, China; May 23, 2008.
Texas Instruments; "Search space of enhanced downlink control channel", 3GPP Draft; vol. RAN WG1, No. Dresden, Germany; Jan. 31, 2012.
U.S. Notice of Allowance for U.S. Appl. No. 14/384,263 dated Jun. 8, 2016.
U S. Notice of Allowance for U.S. Appl. No. 15/259,830 dated Oct. 24, 2016.
U.S. Notice of Allowance for U.S. Appl. No. 15/412,787 dated Jan. 29, 2018.
U.S. Office Action for U.S. Appl. No. 14/384,263 dated Jan. 6, 2016.
U.S. Office Action for U.S. Appl. No. 15/412,787 dated Jul. 3, 2017.
Ad-Hoc Chairman (Samsung): "Summary of UL COMP Session," 3GPP Draft; R1-120910, vol. RAN WG1, No. Dresden, Germany; Feb. 13, 2012.
Huawei Technologies: "Core part: Coordinated Multi-Point Operation for LTE—Uplink," 3GPP Draft, RP-120095, France, vol. TSG RAN, No. Xiamen, China; Feb. 22, 2012.

\* cited by examiner

TERMINAL DEVICE, BASE STATION DEVICE, COMMUNICATION METHOD, AND INTEGRATED CIRCUIT FOR PROCESSING DEMODULATION REFERENCE SIGNALS

This application is a Continuation of application Ser. No. 16/279,886, filed on Feb. 19, 2019, which is a Continuation of application Ser. No. 15/965,356, filed on Apr. 27, 2018; now U.S. Pat. No. 10,225,058, issued Mar. 2019, which is a Continuation of application Ser. No. 15/412,787, filed on Jan. 23, 2017; now U.S. Pat. No. 9,985,764, issued May 29, 2018, which is a Continuation of application Ser. No. 15/259,830, filed on Sep. 8, 2016, now U.S. Pat. No. 9,590,785B2, issued on Mar. 7, 2017; which is a Continuation of application Ser. No. 14/384,263, filed on Sep. 10, 2014, now U.S. Pat. No. 9,479,311B2, issued on Oct. 25, 2016; which is the U.S. National Phase of PCT/JP2013/057009, filed Mar. 13, 2013, and which claims priority to Application No. JP2012-056899 filed in Japan, on Mar. 14, 2012, The entire contents of all of the above applications is hereby incorporated by reference.

TECHNICAL FIELD

The present invention relates to a terminal device, a base station device, a communication method, an integrated circuit, and a wireless communication system.

BACKGROUND ART

In wireless communication systems such as systems based on LTE (Long Term Evolution) and LTE-A (LTE-Advanced), which are developed by 3GPP (Third Generation Partnership Project), and WiMAX (Worldwide Interoperability for Microwave Access), which is developed by IEEE (The Institute of Electrical and Electronics engineers), a base station and a terminal each include one or a plurality of transmit/receive antennas, and utilize, for example, MIMO (Multiple Input Multiple Output) technology to achieve high-speed data transmission.

In the wireless communication systems, the support of MU-MIMO (Multiple User MIMO) in which a plurality of terminals perform spatial multiplexing using the same frequency and time resources is being examined. The support of a CoMP (Cooperative Multipoint) transmission scheme in which a plurality of base stations cooperate with one another to perform interference coordination is also being examined. For example, a wireless communication system designed to use heterogeneous network deployment (HetNet) implemented by a wide-coverage macro base station, an RRH (Remote Radio Head) with coverage smaller than the macro base station, and so on is being examined.

In the above-described wireless communication systems, interference occurs if uplink signals (uplink data or uplink control information) transmitted from a plurality of terminals have the same characteristics. Interference also occurs if uplink reference signals transmitted from a plurality of terminals have the same characteristics. To mitigate or eliminate interference between demodulation reference signals (also referred to as DMRSs) transmitted from a plurality of terminals, for example, a method for orthogonalizing the demodulation reference signals has been proposed (NPL 1).

CITATION LIST

Non Patent Literature

NPL 1; DMRS enhancements for UL CoMP; 3GPP TSG RAN WG1 meeting #68 RI-120277, Feb. 6-10, 2012.

DISCLOSURE OF THE INVENTION

Problems to be Solved by the Invention

However, there is no description regarding a specific procedure which allows a base station and a terminal in a wireless communication system to determine parameters related to uplink signals or uplink reference signals. That is, no description is given of how a base station and a terminal determine parameters related to uplink signals or uplink reference signals and perform communication.

The present invention has been made in light of the foregoing problem, and it is an object of the present invention to provide a base station device, a terminal device, a communication method, an integrated circuit, and a communication system that enable a base station and a terminal to determine parameters related to uplink signals or uplink reference signals and to perform efficient communication.

Means for Solving the Problems (1) To achieve the object described above, the present invention takes the following solutions: A terminal device that transmits a demodulation reference signal associated with a physical uplink shared channel to a base station device includes determining a sequence group number on the basis of a value of a parameter configured by a higher layer, determining the sequence group number on the basis of a physical layer cell identity, and generating a sequence of the demodulation reference signal on the basis of the sequence group number, wherein the sequence group number is determined on the basis of the physical layer cell identity in a case where a transmission on the physical uplink shared channel corresponding to a downlink control information format to which CRC parity bits scrambled by a Temporary C-RNTI are attached is performed in a random access procedure.

(2) In addition, a terminal device that transmits a demodulation reference signal associated with a physical uplink shared channel to a base station device includes determining a sequence group number on the basis of a value of a parameter configured by a higher layer, determining the sequence group number on the basis of a physical layer cell identity, and generating a sequence of the demodulation reference signal on the basis of the sequence group number, wherein the sequence group number is determined on the basis of the physical layer cell identity in a case where a transmission of a message 3 on the physical uplink shared channel corresponding to a random access response grant is performed in a random access procedure.

(3) In addition, a base station device that receives a demodulation reference signal associated with a physical uplink shared channel from a terminal device, a sequence of the demodulation reference signal being generated on the basis of a sequence group number, includes identifying the sequence group number on the basis of a value of a parameter of a higher layer, and identifying the sequence group number on the basis of a physical layer cell identity, wherein the sequence group number is identified on the basis of the physical layer cell identity in a case where a downlink control information format to which CRC parity bits scrambled by a Temporary C-RNTI are attached is used for scheduling of a transmission on the physical uplink shared channel in a random access procedure.

(4) In addition, a base station device that receives a demodulation reference signal associated with a physical uplink shared channel from a terminal device, a sequence of the demodulation reference signal being generated on the basis of a sequence group number, includes identifying the sequence group number on the basis of a value of a parameter of a higher layer, and identifying the sequence group number on the basis of a physical layer cell identity, wherein the sequence group number is identified on the basis of the physical layer cell identity in a case where a random access response grant is used for scheduling of a transmission of a message 3 on the physical uplink shared channel in a random access procedure.

(5) in addition, an integrated circuit mountable on a terminal device that transmits a demodulation reference signal associated with a physical uplink shared channel to a base station device causes the terminal device to perform functions including determining a sequence group number on the basis of a value of a parameter configured by a higher layer; determining the sequence group number on the basis of a physical layer cell identity; and generating a sequence of the demodulation reference signal on the basis of the sequence group number, wherein the integrated circuit causes the terminal device to perform a function including determining the sequence group number on the basis of the physical layer cell identity in a case where a transmission on the physical uplink shared channel corresponding to a downlink control information format to which CRC parity bits scrambled by a Temporary C-RNTI are attached is performed in a random access procedure.

(6) In addition, an integrated circuit mountable on a terminal device that transmits a demodulation reference signal associated with a physical uplink shared channel to a base station device causes the terminal device to perform functions including determining a sequence group number on the basis of a value of a parameter configured by a higher layer; determining the sequence group number on the basis of a physical layer cell identity; and generating a sequence of the demodulation reference signal on the basis of the sequence group number, wherein the integrated circuit causes the terminal device to perform a function including determining the sequence group number on the basis of the physical layer cell identity in a case where a transmission of a message 3 on the physical uplink shared channel corresponding to a random access response grant is performed in a random access procedure.

(7) In addition, an integrated circuit mountable on a base station device that receives a demodulation reference signal associated with a physical uplink shared channel from a terminal device, a sequence of the demodulation reference signal being generated on the basis of a sequence group number, causes the base station device to perform functions including identifying the sequence group number on the basis of a value of a parameter of a higher layer; and identifying the sequence group number on the basis of a physical layer cell identity, wherein the integrated circuit causes the base station device to perform a function including identified the sequence group number on the basis of the physical layer cell identity in a case where a downlink control information format to which CRC parity bits scrambled by a Temporary C-RNTI are attached is used for scheduling of a transmission on the physical uplink shared channel in a random access procedure.

(8) In addition, an integrated circuit mountable on a base station device that receives a demodulation reference signal associated with a physical uplink shared channel from a terminal device, a sequence of the demodulation reference signal being generated on the basis of a sequence group number, causes the base station device to perform functions including identifying the sequence group number on the basis of a value of a parameter of a higher layer; and identifying the sequence group number on the basis of a physical layer cell identity, wherein the integrated circuit causes the base station device to perform a function including identifying the sequence group number on the basis of the physical layer cell identity in a case where a random access response grant is used for scheduling of a transmission of a message 3 on the physical uplink shared channel in a random access procedure.

Effects of the Invention

According to the present invention, a base station and a terminal can determine parameters related to uplink signals or uplink reference signals and perform efficient communication.

BEST MODE FOR CARRYING OUT THE INVENTION

An embodiment of the present invention will be described hereinafter. A wireless communication system according to the embodiment of the present invention includes, as base station devices (hereinafter also referred to as base stations, transmitting devices, cells, serving cells, transmit stations, transmission points, transmit antenna groups, transmit antenna port groups, or eNodeBs), a primary base station (also referred to as a macro base station, a first base station, a first communication device, a serving base station, an anchor base station, or a primary cell) and a secondary base station (also referred to as an RRH, a pico base station, a femto base station, a Home eNodeB, a second base station device, a second communication device, a cooperative base station group, a cooperative base station set, a cooperative base station, or a secondary cell). The wireless communication system further includes a mobile station device (hereinafter also referred to as a terminal, a terminal device, a mobile terminal, a receiving device, a reception point, a receiver terminal, a third communication device, a receive antenna group, a receive antenna port group, or user equipment (UE)).

The secondary base station may be one of a plurality of secondary base stations. For example, the primary base station and the secondary base station utilize the heterogeneous network deployment, in which part or all of the coverage of the secondary base station is included in the coverage of the primary base station, to communicate with the terminal.

Figure 1:
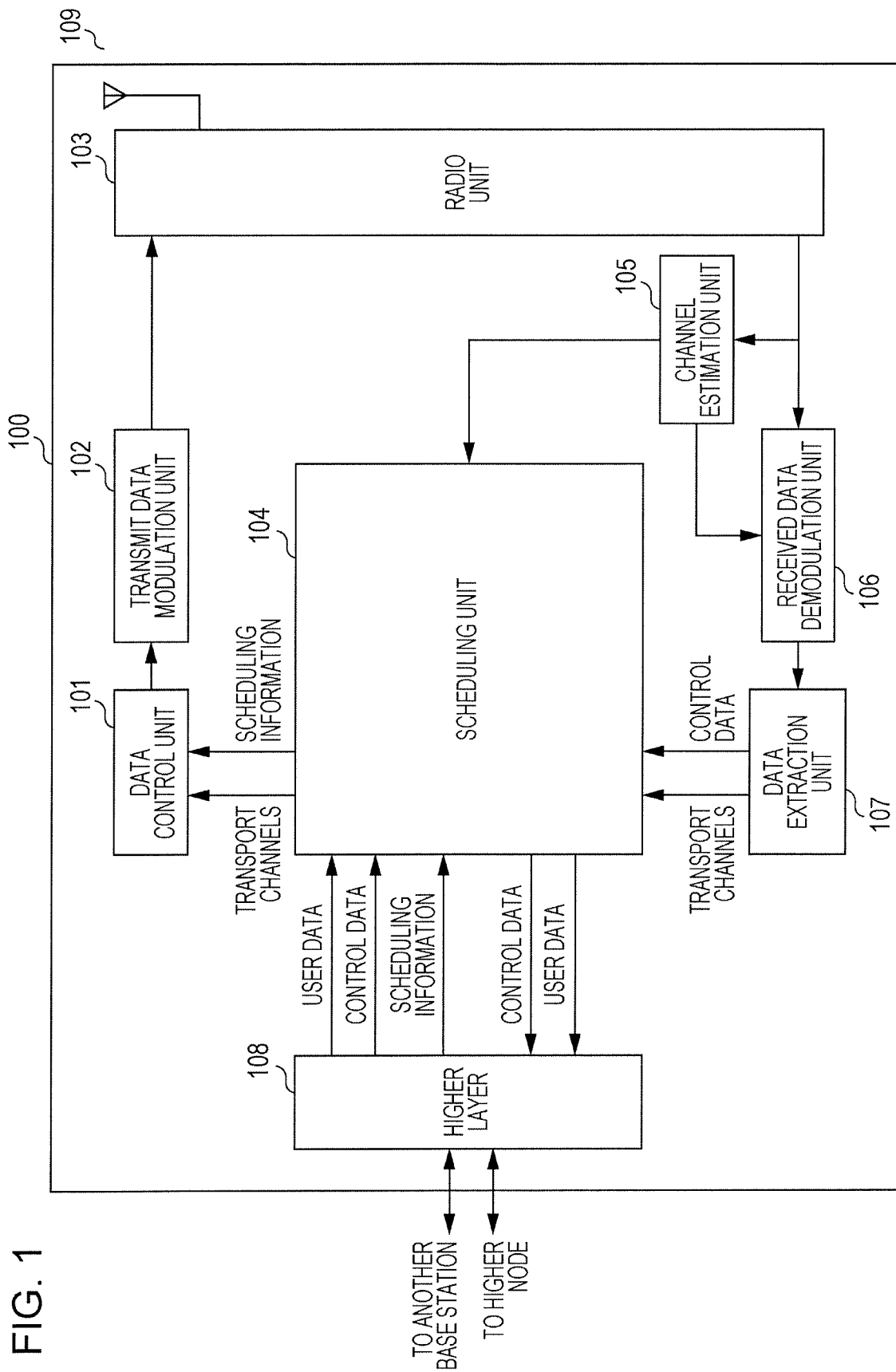
FIG. 1 is a schematic block diagram illustrating a configuration of a base station according to an embodiment of the present invention.

FIG. 1 is a schematic block diagram illustrating a configuration of a base station according to an embodiment of the present invention. The base station illustrated in FIG. 1 is a primary base station or a secondary base station. The base station includes a data control unit 101, a transmit data modulation unit 102, a radio unit 103, a scheduling unit 104, a channel estimation unit 105, a received data demodulation unit 106, a data extraction unit 107, a higher layer 108, and an antenna 109. The radio unit 103, the scheduling unit 104, the channel estimation unit 105, the received data demodulation unit 106, the data extraction unit 107, the higher layer 108, and the antenna 109 constitute a receiving section. The data control unit 101, the transmit data modulation unit 102, the radio unit 103, the scheduling unit 104, the higher layer 108, and the antenna 109 constitute a transmitting section. Here, each of the components constituting the base station is also referred to as a unit.

The data control unit 101 receives transport channels from the scheduling unit 104. The data control unit 101 maps the transport channels and signals generated in the physical layer to physical channels on the basis of scheduling information input from the scheduling unit 104. The mapped pieces of data are output to the transmit data modulation unit 102.

The transmit data modulation unit 102 modulates/codes transmit data. The transmit data modulation unit 102 performs signal processing operations, such as modulation/coding, serial/parallel conversion of input signals, IFFT (Inverse Fast Fourier Transform) processing, and CP (Cyclic Prefix) insertion, on the data input from the data control unit 101 on the basis of the scheduling information supplied from the scheduling unit 104 and so on to generate transmit data, and outputs the transmit data to the radio unit 103.

The radio unit 103 generates a radio signal by up-converting the transmit data input from the transmit data modulation unit 102 to a radio frequency signal, and transmits the radio signal to a terminal via the antenna 109. In addition, the radio unit 103 receives a radio signal received from the terminal via the antenna 109, down-converts the radio signal to a baseband signal, and outputs the received data to the channel estimation unit 105 and the received data demodulation unit 106.

The scheduling unit 104 performs operations such as mapping between logical channels and transport channels and downlink and uplink scheduling. Since the scheduling unit 104 controls the physical-layer processors in an integrated manner, an interface exists between the scheduling unit 104 and the respective units, namely, the antenna 109, the radio unit 103, the channel estimation unit 105, the received data demodulation unit 106, the data control unit 101, the transmit data modulation unit 102, and the data extraction unit 107.

In the downlink scheduling, the scheduling unit 104 controls transmission on transport channels and physical channels and generates scheduling information on the basis of uplink control information received from the terminal, scheduling information input from the higher layer 108, and so on. The scheduling information used for the downlink scheduling is output to the data control unit 101.

In the uplink scheduling, the scheduling unit 104 generates scheduling information on the basis of an uplink channel state output from the channel estimation unit 105, the scheduling information input from the higher layer 108, and so on. The scheduling information used for the uplink scheduling is output to the data control unit 101.

In addition, the scheduling unit 104 maps downlink logical channels input from the higher layer 108 to transport channels, and outputs the transport channels to the data control unit 101. The scheduling unit 104 further maps uplink transport channels and control data input from the data extraction unit 107 to uplink logical channels after processing the uplink transport channels and the control data, if necessary, and outputs the uplink logical channels to the higher layer 108.

The channel estimation unit 105 estimates an uplink channel state from uplink reference signals (e.g., demodulation reference signals) for the demodulation of uplink data, and outputs the uplink channel state to the received data demodulation unit 106. The channel estimation unit 105 further estimates an uplink channel state from uplink reference signals (e.g., sounding reference signals) for uplink scheduling, and outputs the uplink channel state to the scheduling unit 104.

The received data demodulation unit 106 demodulates received data. The received data demodulation unit 106 performs a demodulation process on modulated data input from the radio unit 103 by preforming signal processing operations, such as a DFT transform, subcarrier mapping, and an IFFT transform, on the basis of the estimated uplink channel state input from the channel estimation unit 105, and outputs the received data to the data extraction unit 107.

The data extraction unit 107 checks the received data input from the received data demodulation unit 106 for correctness, and outputs the check result (e.g. ACK or NACK) to the scheduling unit 104. In addition, the data extraction unit 107 separates the data input from the received data demodulation unit 106 into transport channels and physical layer control data, and outputs the transport channels and the physical layer control data to the scheduling unit 104.

The higher layer 108 performs the processing of the radio resource control (RRC) layer and the processing of the MAC (Media Access Control) layer. Since the higher layer 108 controls the lower-layer processors in an integrated manner, an interface exists between the higher layer 108 and the respective units, namely, the scheduling unit 104, the antenna 109, the radio unit 103, the channel estimation unit 105, the received data demodulation unit 106, the data control unit 101, the transmit data modulation unit 102, and the data extraction unit 107.

Figure 2:
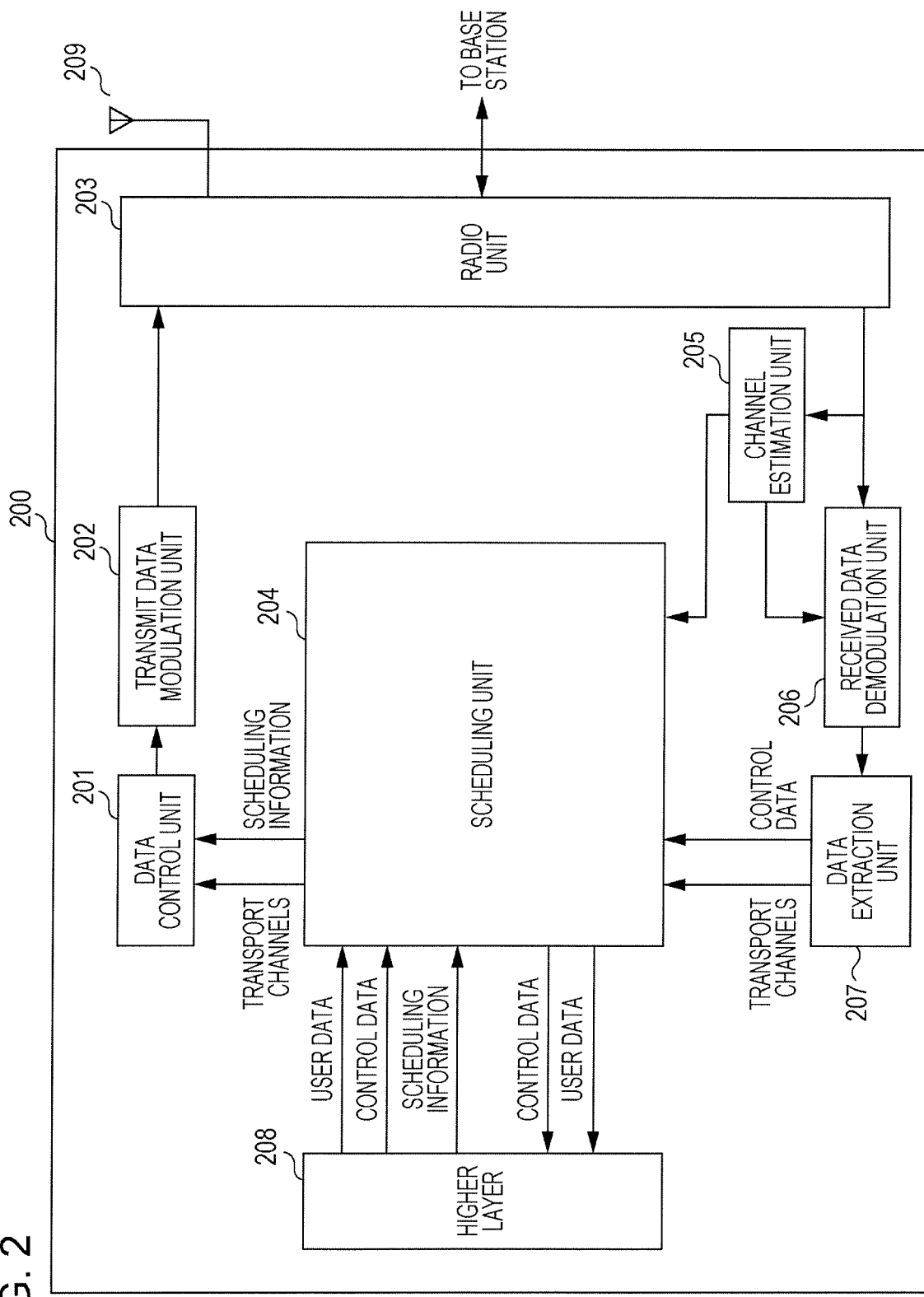
FIG. 2 is a schematic block diagram illustrating a configuration of a terminal according to the embodiment of the present invention.

FIG. 2 is a schematic block diagram illustrating a configuration of a terminal according to the embodiment of the present invention. The terminal includes a data control unit 201, a transmit data modulation unit 202, a radio unit 203, a scheduling unit 204, a channel estimation unit 205, a received data demodulation unit 206, a data extraction unit 207, a higher layer 208, and an antenna 209. The data control unit 201, the transmit data modulation unit 202, the radio unit 203, the scheduling unit 204, the higher layer 208, and the antenna 209 constitute a transmitting section. The radio unit 203, the scheduling unit 204, the channel estimation unit 205, the received data demodulation unit 206, the data extraction unit 207, the higher layer 208, and the antenna 209 constitute a receiving section. Here, each of the components constituting the terminal is also referred to as a unit.

The data control unit 201 receives transport channels from the scheduling unit 204. In addition, the data control unit 201 maps the transport channels and signals generated in the physical layer to physical channels on the basis of scheduling information input from the scheduling unit 204. The mapped pieces of data are output to the transmit data modulation unit 202.

The transmit data modulation unit 202 modulates/codes transmit data. The transmit data modulation unit 202 performs signal processing operations, such as modulation/coding, serial/parallel conversion of input signals, IFFT processing, and CP insertion, on the data input from the data control unit 201 to generate transmit data, and outputs the transmit data to the radio unit 203.

The radio unit 203 generates a radio signal by up-converting the transmit data input from the transmit data modulation unit 202 to a radio frequency signal, and transmits the radio signal to a base station via the antenna 209. In addition, the radio unit 203 receives a radio signal received from the base station via the antenna 209, down-converts the radio signal to a baseband signal, and outputs the received data to the channel estimation unit 205 and the received data demodulation unit 206.

The scheduling unit 104 performs operations such as mapping between logical channels and transport channels and downlink and uplink scheduling. Since the scheduling unit 204 controls the physical-layer processors in an integrated manner, an interface exists between the scheduling unit 204 and the respective units, namely, the antenna 209, the data control unit 201, the transmit data modulation unit 202, the channel estimation unit 205, the received data demodulation unit 206, the data extraction unit 207, and the radio unit 203.

In the downlink scheduling, the scheduling unit 204 controls reception on transport channels and physical channels and generates scheduling information on the basis of downlink control information received from a base station, scheduling information input from the higher layer 208, and so on. The scheduling information used for the downlink scheduling is output to the data control unit 201.

In the uplink scheduling, the scheduling unit 204 performs a scheduling process to map the uplink logical channels input from the higher layer 208 to transport channels, and generates scheduling information used for the uplink scheduling, on the basis of downlink control information received from a base station, the scheduling information input from the higher layer 208, and so on. The scheduling information is output to the data control unit 201.

In addition, the scheduling unit 204 maps uplink logical channels input from the higher layer 208 to transport channels, and outputs the transport channels to the data control unit 201. The scheduling unit 204 also outputs channel state information input from the channel estimation unit 205 and a result of checking CRC (Cyclic Redundancy Check) parity bits (also referred to simply as the CRC) which is input from the data extraction unit 207 to the data control unit 201.

In addition, the scheduling unit 204 determines parameters related to uplink signals, and generates uplink signals using the determined parameters. The scheduling unit 204 further determines parameters related to reference signals, and generates reference signals using the determined parameters.

The channel estimation unit 205 estimates a downlink channel state from downlink reference signals (e.g., demodulation reference signals) for the demodulation of downlink data, and outputs the downlink channel state to the received data demodulation unit 206. In addition, the received data demodulation unit 206 demodulates received data input from the radio unit 203, and outputs the received data to the data extraction unit 207.

The data extraction unit 207 checks the received data input from the received data demodulation unit 206 for correctness, and outputs the check result (e.g., ACK or HACK) to the scheduling unit 204. In addition, the data extraction unit 207 separates the received data input from the received data demodulation unit 206 into transport channels and physical layer control data, and outputs the transport channels and the physical layer control data to the scheduling unit 204.

The higher layer 208 performs the processing of the radio resource control layer and the MAC layer. Since the higher layer 208 controls the lower-layer processors in an integrated manner, an interface exists between the higher layer 208 and the respective units, namely, the scheduling unit 204, the antenna 209, the data control unit 201, the transmit data modulation unit 202, the channel estimation unit 205, the received data demodulation unit 206, the data extraction unit 207, and the radio unit 203.

Figure 3:
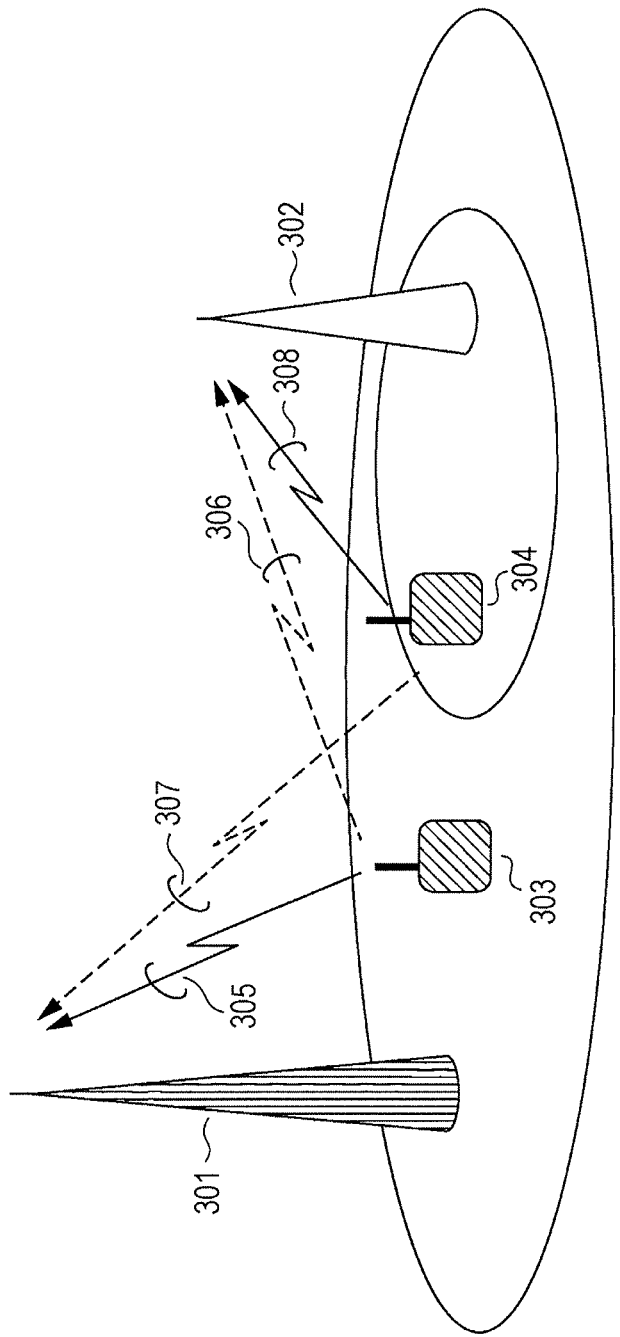
FIG. 3 is a schematic diagram illustrating an example of communication according to the embodiment of the present invention.

FIG. 3 is a schematic diagram illustrating an example of communication according to the embodiment of the present invention. In FIG. 3, a terminal 303 communicates with a primary base station 301 and/or a secondary base station 302. In addition, a terminal 304 communicates with the primary base station 301 and/or the secondary base station 302.

In FIG. 3, when transmitting an uplink signal to a base station, a terminal transmits the uplink signal with which the demodulation reference signal (DMRS), which is a signal known between the base station and the terminal, is multiplexed. The uplink signal includes uplink data (uplink shared channel (UL-SCH) or an uplink transport block). In addition, the uplink signal includes uplink control information (UCI). Here, the UL-SCH is a transport channel.

For example, the uplink data is mapped to a physical uplink shared channel (PUSCH). The uplink control information is mapped to the PUSCH or a physical uplink control channel (PUCCH). That is, in a wireless communication system, the demodulation reference signal associated with transmission of the PUSCH (transmission on the PUSCH) is supported. In the wireless communication system, furthermore, the demodulation reference signal associated with transmission of the PUCCH (transmission on the PUCCH) is supported.

In the following, the demodulation reference signal associated with transmission of the PUSCH is also represented as a first reference signal. The demodulation reference signal associated with transmission of the PUCCH is also represented as a second reference signal. The first reference signal and the second reference signal are also represented as reference signals.

That is, the first reference signal is used for demodulation of the PUSCH. For example, the first reference signal is transmitted on resource blocks (also referred to as physical resource blocks, physical resources, or resources) to which the corresponding PUSCH is mapped. The second reference signal is used for demodulation of the PUCCH. For example, the second reference signal is transmitted on resource blocks to which the corresponding PUCCH is mapped.

Specifically, the terminal 303 multiplexes the reference signals with the uplink signal that is transmitted to the primary base station 301, and transmits the uplink signal through an uplink 305. In addition, the terminal 303 multiplexes the reference signals with the uplink signal that is transmitted to the secondary base station 302, and transmits the uplink signal through an uplink 306. The terminal 304 multiplexes the reference signals with the uplink signal that is transmitted to the primary base station 301, and transmits the uplink signal through an uplink 307. In addition, the terminal 304 multiplexes the reference signals with the uplink signal that is transmitted to the secondary base station 302, and transmits the uplink signal through an uplink 308.

If the uplink signal transmitted from the terminal 303 and the uplink signal transmitted from the terminal 304 have the same characteristics, interference occurs. Interference also occurs if the reference signal transmitted from the terminal 303 and the reference signal transmitted from the terminal 304 have the same characteristics. For example, if interference occurs in reference signals transmitted from a plurality of terminals, the accuracy with which a channel state used for demodulation of uplink signals will be significantly reduced.

To address this, it is desirable to orthogonalize the reference signal transmitted from the terminal 303 and the reference signal transmitted from the terminal 304. In addition, it is desirable to orthogonalize the uplink signal transmitted from the terminal 303 and the uplink signal transmitted from the terminal 304. In addition, it is desirable to randomize interference between the reference signal transmitted from the terminal 303 and the reference signal transmitted from the terminal 304. In addition, it is desirable to randomize interference between the uplink signal transmitted from the terminal 303 and the uplink signal transmitted from the terminal 304.

In FIG. 3, different cell identities (also referred to as Cell IDs) (also referred to as Different cell IDs) may be configured for the primary base station 301 and the secondary base station 302. The same cell identity (also referred to as the Shared cell ID or Same cell ID) may be configured for all or some of the primary base station 301 and the secondary base station 302. A cell identity is also referred to as a physical layer cell identity (a physical layer cell identifier).

In FIG. 3, furthermore, an aggregation of a plurality of serving cells (also referred to simply as cells) is supported (referred to as a carrier aggregation or a cell aggregation) in the downlink and the uplink. For example, a transmission bandwidth of up to 110 resource blocks in each of the serving cells can be used. In the carrier aggregation, one of the serving cells is defined as a primary cell (Pcell). In the carrier aggregation, furthermore, the serving cells other than the primary cell are defined as secondary cells (Scells).

In the downlink, a carrier corresponding to the serving cell is defined as a downlink component carrier (DLCC). In the downlink, furthermore, a carrier corresponding to the primary cell is defined as a downlink primary component carrier (DLPCC). In the downlink, furthermore, a carrier corresponding to a secondary cell is defined as a downlink secondary component carrier (DLSCC).

In the uplink, a carrier corresponding to the serving cell is defined as an uplink component carrier (ULCC). In the uplink, furthermore, a carrier corresponding to the primary cell is defined as an uplink primary component carrier (ULPCC). In the uplink, furthermore, a carrier corresponding to a secondary cell is defined as an uplink secondary component carrier (ULSCC).

That is, in the carrier aggregation, a plurality of component carriers are aggregated to support a wide transmission bandwidth. Here, for example, the primary base station 301 may also be regarded as the primary cell, and the secondary base station 302 may also be regarded as a secondary cell (the base station may perform configuration for the terminal) (also referred to as HetNet deployment with a carrier aggregation).

Figure 4:
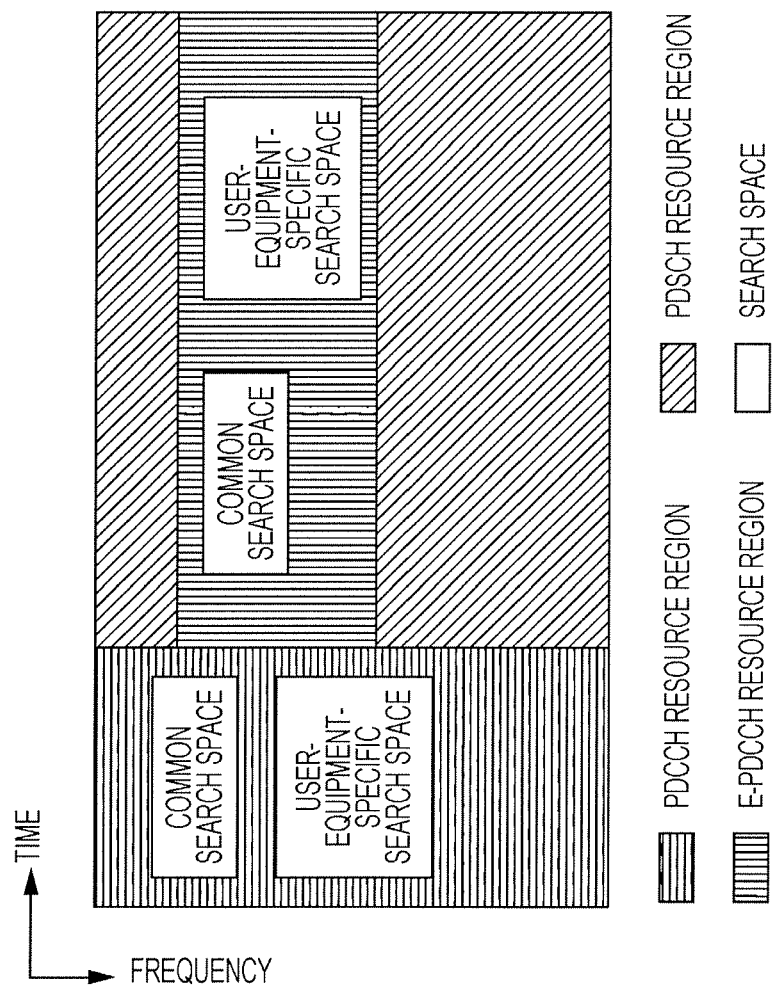
FIG. 4 is a diagram illustrating an example of a downlink signal.

FIG. 4 is a diagram illustrating an example of a downlink signal. In FIG. 4, physical downlink shared channel (PDSCH) resource regions to which downlink data (downlink shared channel (DL-SCH) or downlink transport blocks) is mapped are illustrated. The DL-SCH is a transport channel.

A physical downlink control channel (PDCCH; Physical Downlink Control Channel) resource region to which downlink control information (DCI; Downlink Control information) is mapped is also illustrated. In addition, an E-PDCCH (Enhanced-PDCCH) resource region to which downlink control information is mapped is illustrated.

For example, the PDCCH is mapped to the first through third OFDM symbols in a downlink resource region. In addition, the E-PDCCH is mapped to the fourth through twelfth OFDM symbols in the downlink resource region. In addition, the E-PDCCH is mapped to the first slot and the second slot in one subframe. In addition, the PDSCH and the E-PDCCH are subjected to FDM (Frequency Division Multiplexing). In the following, the E-PDCCH is included in the PDCCH.

The PDCCH is used to signal (specify) downlink control information to the terminal. A plurality of formats are defined for downlink control information that is transmitted on the PDCCH. The formats of the downlink control information are also referred to as DCI formats.

For example, DCI format 1 and DCI format 1A, which are used for the scheduling of one PDSCH (transmission of one PDSCH codeword or one downlink transport block) in one cell, are defined as downlink DCI formats. In addition, DCI format 2, which is used for the scheduling of one PDSCH (transmission of up to two PDSCH codewords or up to two downlink transport blocks) in one cell, is defined as a downlink DCI format.

For example, the downlink DCI format includes downlink control information such as information regarding PDSCH resource allocation and information regarding MCS (Modulation and Coding scheme). The downlink DCI format may include information regarding the base sequence index (also referred to as the base sequence identity). The downlink DCI format may include information regarding the base sequence index associated with PUCCH (also referred to as the base sequence identity associated with PUCCH). In the following, the DCI format used for scheduling of the PDSCH is also represented as a downlink assignment.

In addition, for example, DCI format 0, which is used for the scheduling of one PUSCH (transmission of one PUSCH codeword or one uplink transport block) in one cell, is defined as an uplink DCI format. In addition, DCI format 4, which is used for the scheduling of one PUSCH (transmission of up to two PUSCH codewords or up to two uplink transport blocks) in one cell, is defined as an uplink DCI format. That is, the DCI format 4 is used for scheduling of the PUSCH transmission (transmission mode) that uses a plurality of antenna ports.

For example, the uplink DCI format includes downlink control information such as information regarding PUSCH resource allocation and information regarding MCS (Modulation and Coding scheme). The uplink DCI format may include information regarding the base sequence index. The uplink DCI format may include information for giving instructions to enable or disable a sequence group hopping and/or a sequence hopping. In the following, the DCI format used for scheduling of the PUSCH is also represented as an uplink grant.

In addition, the PDSCH is used for the transmission of downlink data. Furthermore, the PDSCH is used to signal (specify) a random access response grant to the terminal. The random access response grant is used for scheduling of the PUSCH. The random access response grant is provided to the physical layer by a higher layer (e.g., the MAC layer).

For example, the base station configures a random access response that is transmitted as message 2 in a random access procedure so that the random access response includes the random access response grant, and transmits the random access response. In addition, the base station transmits the random access response grant corresponding to message 1 transmitted from the terminal in the random access procedure. In addition, the base station transmits the random access response grant for the transmission of message 3 in the random access procedure. That is, the random access response grant can be used for scheduling of the PUSCH for the transmission of message 3 in the random access procedure.

In FIG. 4, the terminal monitors a set of PDCCH candidates. Here, a PDCCH candidate represents a candidate for which the PDCCH may possibly be allocated and transmitted by the base station. A PDCCH candidate is composed of one or a plurality of control channel elements (CCEs). The term "monitor" means that the terminal attempts to decode each PDCCH in the set of PDCCH candidates in accordance with all the DCI formats to be monitored. The set of PDCCH candidates that the terminal monitors is also referred to as a search space. That is, the search space is a set of resources that may possibly be used by the base station for PDCCH transmission.

Furthermore, a common search space (CSS) and a user-equipment-specific search space (USS; UE-Specific Search Space, terminal-specific (terminal-unique) search space) are configured (defined or set) in the PDCCH resource region.

That is, in FIG. 4, the CSS and/or the USS are configured in the PDCCH resource region. In addition, the CSS and/or the USS are configured in the E-PDCCH resource region. The terminal monitors the PDCCH in the CSS and/or USS in the PDCCH resource region, and detects a PDCCH addressed to the terminal. In addition, the terminal monitors the E-PDCCH in the CSS and/or the USS in the E-PDCCH resource region, and detects an E-PDCCH addressed to the terminal.

The CSS is used for the transmission of downlink control information to a plurality of terminals. That is, the CSS is defined by a resource common to a plurality of terminals. For example, the CSS is composed of CCEs having numbers that are predetermined between the base station and the terminal. For example, the CSS is composed of CCEs having indices 0 to 15. The CSS may be used for the transmission of downlink control information to a specific terminal. That is, the base station transmits, in the CSS, a DCI format intended for a plurality of terminals and/or a DCI format intended for a specific terminal.

The USS is used for the transmission of downlink control information to a specific terminal. That is, the USS is defined by a resource dedicated to a certain terminal. That is, the USS is defined independently for each terminal. For example, the USS is composed of CCEs having numbers that are determined on the basis of a radio network temporary identifier (RNTI; Radio Network Temporary Identifier) assigned by the base station, a slot number in a radio frame, an aggregation level, or the like. Here, RNTIs include a C-RNTI (Cell RNTI) and a Temporary C-RNTI. That is, the base station transmits, in the USS, a DCI format intended for a specific terminal.

Here, an RNTI assigned to the terminal by the base station is used for the transmission of downlink control information (transmission on the PDCCH). Specifically, CRC (Cyclic Redundancy Check parity bits (also referred to simply as the CRC), which are generated on the basis of downlink control information (or, instead, DCI format), are attached to the downlink control information, and, after attachment, the CRC parity bits are scrambled by the RNTI.

The terminal attempts to decode the downlink control information with the CRC parity bits scrambled by the RNTI, and detects a PDCCH in which the CRC is successful as a PDCCH addressed to the terminal (also referred to as blind decoding). Here, RNTIs include the C-RNTI and the Temporary C-RNTI. That is, the terminal decodes the PDCCH with the CRC scrambled by the C-RNTI. In addition, the terminal decodes the PDCCH with the CRC scrambled by the Temporary C-RNTI, The C-RNTI is a unique identifier used to identify RRC (Radio Resource Control) connection and scheduling. For example, the C-RNTI is used for dynamically scheduled unicast transmission.

The Temporary C-RNTI is an identifier used for the random access procedure. The base station transmits the Temporary C-RNTI by including the Temporary C-RNTI in the random access response. For example, the Temporary C-RNTI is used in the random access procedure to identify a terminal that is currently performing the random access procedure. In addition, the Temporary C-RNTI is used for a retransmission of message 3 in the random access procedure. That is, in order for the terminal to retransmit message 3, the base station transmits downlink control information on the PDCCH with the CRC scrambled by the Temporary C-RNTI. That is, the terminal changes the interpretation of the downlink control information on the basis of the type of RNTI by which the CRC has been scrambled.

For example, the terminal executes the random access procedure to take synchronization with the base station in the time domain. In addition, the terminal executes the random access procedure for initial connection establishment. In addition, the terminal executes the random access procedure to make a handover. In addition, the terminal executes the random access procedure for connection re-establishment (connection re-establishment). In addition, the terminal executes the random access procedure to make a request for UL-SCH resources.

When a PDSCH resource is scheduled using downlink control information transmitted on the PDCCH, the terminal receives downlink data on the scheduled PDSCH. When a PUSCH resource is scheduled using downlink control information transmitted on the PDCCH, the terminal transmits uplink data and/or uplink control information on the scheduled PUSCH. As described above, the terminal attempts to decode the downlink control information with the CRC parity bits scrambled by the RNTI, and detects a PDCCH in which the CRC is successful as a PDCCH addressed to the terminal, Here, RNTIs include the C-RNTI and the Temporary C-RNTI. Here, the first reference signal is multiplexed with the uplink data and/or the uplink control information transmitted on the PUSCH.

In addition, the terminal transmits the uplink control information on the PUCCH. For example, the terminal transmits information indicating ACK/NACK for downlink data (also referred to as ACK/NACK in HARQ; Hybrid Automatic Repeat Request) on the PUCCH. Here, the terminal transmits the uplink control information using the PUCCH resource corresponding to the number of the first CCE (also referred to as the lowest CCE index used for composing the PDCCH) which has been used for PDCCH transmission (used for the transmission of the downlink assignment). Here, the second reference signal is multiplexed in the transmission of the uplink control information transmitted on the PUCCH.

In addition, the base station and the terminal transmit and receive a signal in a higher layer. For example, the base station and the terminal transmit and receive a radio resource control signal (also referred to as RRC signaling; Radio Resource Control signal, RRC message; Radio Resource Control message, or RRC information; Radio Resource Control information) in the RRC layer (Layer 3). Here, dedicated signaling transmitted from the base station to a certain terminal in the RRC layer is also referred to as a dedicated signal (dedicated signaling). That is, configurations (information) specific to (unique to) a certain terminal are signaled by the base station by using the dedicated signal.

In addition, the base station and the terminal transmit and receive a MAC control element in the MAC (Media Access Control) layer (Layer 2). Here, RRC signaling and/or MAC control element is also referred to as higher layer signaling.

An example of a method for generating a reference signal sequence $r^{(\alpha)}_{u,v}$ will be discussed hereinafter. The reference signal sequence is used to generate a sequence of the first reference signal. In addition, the reference signal sequence is used to generate a sequence of the second reference signal. For example, the reference signal sequence is defined in accordance with mathematical expression 1 by a cyclic shift of a base sequence $\bar{r}^{(\alpha)}_{u,v}(n)$.

$$r_{u,v}^{(\alpha)} = e^{j\alpha n}\bar{r}_{u,v}(n), 0 \leq n \leq M_{SC}^{RS} \quad \text{[Math. 1]}$$

That is, the reference signal sequence is generated by applying the cyclic shift α to the base sequence. In addition, multiple reference signal sequences are defined from a single base sequence through different values of the cyclic shift α. Here, $M_{SC}^{RS}$ denotes the length of the reference signal sequence, and is represented by, for example, $M_{SC}^{RS} = mN_{SC}^{RB}$. In addition, $N_{SC}^{RB}$ denotes the size of a resource block in the frequency domain, and is represented by, for example, the number of subcarriers.

In addition, the base sequence is divided into groups. That is, the base sequence is represented by a group number (also referred to as a sequence group number) u and a base sequence number v within the corresponding group. For example, the base sequence is divided into 30 groups, and each of the groups includes two base sequences. In addition, the sequence group hopping is applied to the 30 groups. In addition, the sequence hopping is applied to two base sequences in one group.

Here, each of the sequence group number u and the base sequence number v can vary in time. In addition, the definition of the base sequence depends on the sequence length $M_{SC}^{RS}$. For example, if $M_{SC}^{RS} \leq 3N_{SC}^{RB}$, the base sequence is given by mathematical expression 2.

$$\bar{r}_{u,v}(n) = x_q(n \bmod N_{ZC}^{RS}), 0 \leq n \leq M_{SC}^{MS} \quad \text{[Math. 2]}$$

Here, the q-th root Zadoff-Chu sequence $x_q(m)$ is defined by mathematical expression 3.

$$x_q(m) = e^{-j\frac{\pi qm(m+1)}{N_{ZC}^{RS}}}, 0 \leq m \leq N_{ZC}^{RS} - 1 \quad \text{[Math. 3]}$$

Here, q is given by mathematical expressions 4.

$$q = \lfloor \bar{q} + 1/2 \rfloor + v \cdot (-1)^{\lfloor 2\bar{q} \rfloor}$$
$$\bar{q} = N_{ZC}^{RS} \cdot (u+1)/31 \quad \text{[Math. 4]}$$

Here, the Zadoff-Chu sequence length $N_{ZC}^{RS}$ is given by the largest prime number that satisfies $N_{ZC}^{RS} > M_{SC}^{RS}$.

In addition, the sequence group number u in the slot $n_s$ is defined in accordance with mathematical expression 5 using a group hopping pattern $f_{gh}(n_s)$ and a sequence shift pattern $f_{ss}$.

$$u = (f_{gh}(n_s) + f_{ss}) \bmod 30 \quad \text{[Math. 5]}$$

Here, the base station can instruct the terminal to enable or disable the sequence group hopping (also referred to simply as a group hopping). As described below, for example, in the case of a condition A, the base station can provide instructions as to whether to enable or disable the sequence group hopping, on the basis of a cell-specific parameter, in the case of a condition B, the base station can provide instructions as to whether to enable or disable the sequence group hopping, on the basis of a terminal-specific (user-equipment-specific; UE-specific) parameter. The details of the conditions A and B will be described below.

For example, when instructed by the base station to enable the sequence group hopping, the terminal performs hopping on the groups of the reference signal sequence on a slot-by-slot basis. That is, the terminal determines whether to perform hopping on the groups of the reference signal sequence on a slot-by-slot basis, in accordance with the enabling or disabling of the sequence group hopping.

Here, for example, the group hopping pattern $f_{gh}(n_s)$ is given by mathematical expression 6.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Math. 6]}$$

Here, a pseudo random sequence c(i) is defined by mathematical expressions 7. For example, the pseudo random sequence is defined by a Gold sequence of length 31, and is given by mathematical expressions 7.

$$c(n) = (x_1(n+N_C) + x_2(n+N_C)) \bmod 2$$
$$x_1(n+31) = (x_1(n+3) + x_1(n)) \bmod 2$$
$$x_2(n+31) = (x_2(n+3) + x_2(n+2) + x_2(n+1) + x_2(n)) \bmod 2 \quad \text{[Math. 7]}$$

Here, for example, $N_c = 1600$. In addition, a first m-sequence $x_1$ is initialized by $x_1(0) = 1$ and $x_1(n) = 0$, where n=1, 2, ..., 30. In addition, a second m-sequence $x_2$ is initialized by mathematical expression 8.

$$C_{init} = \sum_{i=0}^{30} x_2(i) \cdot 2^i \quad \text{[Math. 8]}$$

Here, $C_{init}$ is defined by mathematical expression 9. That is, the pseudo random sequence of the group hopping pattern $f_{gh}(n_s)$ is initialized by mathematical expression 9.

$$c_{init} = \begin{cases} \left\lfloor \frac{N_{ID}^{cell}}{30} \right\rfloor & \ldots (1) \text{ if condition } A \\ \left\lfloor \frac{X}{30} \right\rfloor & \ldots (2) \text{ if condition } B \end{cases} \quad \text{[Math. 9]}$$

The details of the physical layer cell identity $N_{ID}^{cell}$ and the parameter "X" will be described below.

In addition, the definition of the sequence shift pattern $f_{ss}$ differs between the PUCCH and the PUCCH. For example, for the PUCCH, the sequence shift pattern $f_{ss}^{PUCCH}$ is given by mathematical expression 10. For the PUSCH, the sequence shift pattern $f_{ss}^{PUSCH}$ is given by mathematical expression 11.

$$f_{ss}^{PUCCH} = \begin{cases} N_{ID}^{cell} \bmod 30 \ldots \text{(1) if condition } A \\ X \bmod 30 \ldots \text{(2) if condition } B \end{cases} \quad \text{[Math. 10]}$$

$$f_{ss}^{PUSCH} = \begin{cases} (f_{ss}^{PUCCH} + \Delta_{ss}) \bmod 30 \ldots \text{(1) if condition } A \\ (f_{ss}^{PUCCH} + Y) \bmod 30 \ldots \text{(2) if condition } B \end{cases} \quad \text{[Math. 11]}$$

The details of the physical layer cell identity $N_{ID}^{cell}$ and the parameter "X" will be described below. The details of the parameter $\Delta_{ss}$ and the parameter "Y" will be described below.

In addition, the base sequence number v within the base sequence group in the slot $n_s$ is defined by mathematical expression 12, Here, the sequence hopping may be applied only to the reference signals whose lengths are greater than or equal to $6N_{SC}^{RB}$. That is, the base sequence number v is given by v=0 for the reference signals whose lengths are less than $6N_{SC}^{RB}$.

$$v = \begin{cases} c(n_s) & \text{if group hopping is disabled and sequence hopping is enabled} \\ 0 & \text{otherwise} \end{cases} \quad \text{[Math. 12]}$$

Here, the base station can instruct the terminal to enable or disable the sequence hopping. As described below, for example, in the case of the condition A, the base station can provide instructions as to whether to enable or disable the sequence hopping, on the basis of the cell-specific parameter. In the case of the condition B, the base station can provide instructions as to whether to enable or disable the sequence hopping, on the basis of the UE-specific parameter. The details of the conditions A and B will be described below.

For example, when instructed by the base station to enable the sequence hopping, the terminal performs hopping on the sequences within a group on a slot-by-slot basis, That is, the terminal determines whether to perform hopping on sequences within the group on a slot-by-slot basis, in accordance with the enabling or disabling of the sequence hopping.

Here, the pseudo random sequence c(i) is defined by mathematical expressions 7 and mathematical expression 8. In addition, $c_{init}$ is defined by mathematical expression 13. That is, the pseudo random sequence of the base sequence number v is initialized by mathematical expression 13.

$$c_{init} = \begin{cases} \left\lfloor \dfrac{N_{ID}^{cell}}{30} \right\rfloor \cdot 2^5 + f_{ss}^{PUSCH} \ldots \text{(1) if condition } A \\ \left\lfloor \dfrac{X}{30} \right\rfloor \cdot 2^5 + f_{ss}^{PUSCH} \ldots \text{(2) if condition } B \end{cases} \quad \text{[Math. 13]}$$

The details of the physical cell identity $N_{ID}^{cell}$ and the parameter "X" will be described below.

An example of a method for generating a sequence of the first reference signal will be discussed hereinafter. That is, a method for generating the demodulation reference signal for the PUSCH will be discussed. For example, a PUSCH demodulation reference signal sequence $\gamma^{(\lambda)}_{PUSCH}(\cdot)$ associated with Layers $\lambda \in \{0, 1, \ldots, \upsilon-1\}$ is defined by mathematical expression 14.

$$r_{PUSCH}^{(\lambda)}(m \cdot M_{SC}^{RS}+n) = w^{(\lambda)}(m) r_{u,v}^{(\alpha_\lambda)}(m) r_{u,v}^{(\alpha_\alpha)}(n) \quad \text{[Math. 14]}$$

Here, $\upsilon$ denotes the number of transmission layers. For example, m is represented as being equal to 0 or 1, In addition, n is represented as being equal to 0, ..., or $M_{SC}^{RS}-1$. In addition, $M_{SC}^{RS}=M_{SC}^{PUSCH}$, where $M_{SC}^{PUSCH}$ is a bandwidth scheduled for uplink transmission (transmission on the PUSCH) by the base station, and is represented by, for example, the number of subcarriers. Furthermore, $w^{(\lambda)}(m)$ denotes an orthogonal sequence.

In addition, the cyclic shift $\alpha_{80}$ in the slot $n_s$ is given by $\alpha_\lambda = 2\pi n_{cs,\lambda}$. Here, $n_{cs,\lambda}$ is represented by mathematical expression 15. That is, the cyclic shift applied to the first reference signal associated with the PUSCH is defined by mathematical expression 15.

$$n_{cs,\lambda} = (n_{DMRS}^{(1)} + n_{DMRS,\lambda}^{(2)} n_{PN}(n_s)) \bmod 12 \quad \text{[Math. 15]}$$

Here, $n^{(1)}_{DMRS}$ is signaled by the base station device using the higher layer signaling. In addition, $n^{(2)}_{DMRS,\lambda}$ is indicated by the base station device using the DCI format. In addition, the quantity $n_{PN}(n_s)$ is given by mathematical expression 16.

$$n_{PN}(n_s) = \sum_{i=0}^{7} c(8 N_{symb}^{UL} \cdot n_s + i) \cdot 2^i \quad \text{[Math. 16]}$$

Here, the pseudo random sequence c(i) is defined by mathematical expressions 7 and mathematical expression 8. In addition, $c_{init}$ is defined by mathematical expression 17. That is, the cyclic shift applied to the first reference signal associated with the PUSCH is initialized by mathematical expression 17.

$$c_{init} = \begin{cases} \left\lfloor \dfrac{N_{ID}^{cell}}{30} \right\rfloor \cdot 2^5 + f_{ss}^{PUSCH} \ldots \text{(1) if condition } A \\ Z \ldots \text{(2) if condition } B \end{cases} \quad \text{[Math. 17]}$$

The details of the physical layer cell identity $N_{ID}^{cell}$ and the parameter "Z" will be described below.

An example of a method for generating a sequence of the second reference signal will be discussed hereinafter. That is, a method for generating the demodulation reference signal for the PUCCH will be discussed. For example, a PUCCH demodulation reference signal sequence $\gamma^{(P)}_{PUCCH}(\cdot)$ is defined by mathematical expression 18.

$$r_{PUCCH}^{(p)}(m' N_{RS}^{PUCCH} M_{SC}^{RS} + m M_{SC}^{RS} + n) = \dfrac{1}{\sqrt{p}} w^{(p)}(m) r_{u,v}^{(\alpha_p)}(n) \quad \text{[Math. 18]}$$

Here, for example, m is represented as being equal to 0, ..., or $M_{RS}^{PUCCH}-1$. In addition, n is represented as being equal to 0, ..., or $M_{RS}-1$. In addition, m' is represented as being equal to 0 or 1. Here, p is the number of antenna ports used for PUCCH transmission (transmission on the PUCCH). In addition, the sequence $\gamma^{(\alpha_p)}_{u,v}(n)$ is given by mathematical expression 1, where, for example, $M_{SC}^{RS}=12$.

Here, the cyclic shift $\alpha p(n_s,1)$ is given by mathematical expressions 19. That is, the cyclic shift applied to the second reference signal associated with the PUCCH is defined by mathematical expressions 19.

$$\bar{n}_{cs}^{(p)}(n_s) = \lfloor n'_p(n_s) \cdot \Delta_{shift}^{PUCCH}/N' \rfloor$$

$$\alpha_p(n_s, l) = 2\pi \cdot \bar{n}_{cs}^{(p)}(n_x, l)/N_{SC}^{RS}$$

$$\bar{n}_{cs}^{(p)}(n_s, l) = \begin{cases} [n_{cs}^{cell}(n_s, l) + (n'_p(n_s) \cdot \Delta_{shift}^{PUCCH} + (n_{oc}^{(p)}(n_s) \bmod \Delta_{shift}^{PUCCH})) \bmod N'] \bmod N_{SC}^{RS} & \text{for normal cyclic prefix} \\ [n_{cs}^{cell}(n_s, l) + (n'_p(n_s) \cdot \Delta_{shift}^{PUCCH} + \bar{n}_{oc}^{(p)}(n_s)) \bmod N'] \bmod N_{SC}^{RS} & \text{for } \textit{extendedcyclic} \text{ prefix} \end{cases}$$

[Math. 19]

Here, n'$_P$(n$_s$), N', and $\Delta_{shift}^{PUCCH}$ are determined on the basis of information and so on signaled by the base station. In addition, the number of reference symbols per slot $M_{RS}^{PUCCH}$ and the sequence w(n) are defined in accordance with the specifications and so on.

In addition, the cyclic shift n$_{cs}^{cell}$(n$_s$,1) is defined by mathematical expression 20.

$$n_{cs}^{cell}(n_s, l) = \sum_{i=0}^{7} c(8N_{symb}^{UL} \cdot n_s + 8l + i) \cdot 2^i$$

[Math. 20]

Here, N$_{symb}^{UL}$ is the number of symbols in an uplink slot (the number of SC-FDMA symbols). In addition, the pseudo random sequence c(i) is defined by mathematical expressions 7 and mathematical expression 8. In addition, c$_{init}$ is defined by mathematical expression 21 or mathematical expression 22. That is, the cyclic shift applied to the second reference signal associated with the PUCCH is initialized by mathematical expression 21 or mathematical expression 22.

$$c_{init} = \begin{cases} N_{ID}^{cell} & \dots (1) \text{ if condition } A \\ X & \dots (2) \text{ if condition } B \end{cases}$$

[Math. 21]

$$c_{init} = \begin{cases} N_{ID}^{cell} & \dots (1) \text{ if condition } A \\ K & \dots (2) \text{ if condition } B \end{cases}$$

[Math. 22]

The details of the physical layer cell identity N$_{ID}^{cell}$ and the parameter "X" will be described below. The details of the parameter "K" will also be described below Here, by defining c$_{init}$ using mathematical expression 21, it is possible to use the same parameter "X" for the generation of the first reference signal and the generation of the second reference signal. That is, the parameter "X" that is used for the generation of the first reference signal can also be used for the generation of the second reference signal. The configuration of parameters with efficient use of radio resources is feasible.

The cyclic shift applied to the PUCCH is generated using mathematical expression 20. In addition, c$_{init}$ is defined by mathematical expression 21 or mathematical expression 22. That is, the terminal can transmit on the PUCCH the uplink signal generated using mathematical expression 20 and mathematical expression 21. Alternatively, the terminal can transmit on the PUCCH the uplink signal generated using mathematical expression 20 and mathematical expression 22.

In the mathematical expressions given above, N$_{ID}^{cell}$ denotes a physical layer cell identity (also referred to as a physical layer cell identifier). That is, N$_{ID}^{cell}$ denotes a cell (base station) specific (cell (base station) unique) identity. That is, N$_{ID}^{cell}$ denotes a physical layer identity of a cell. For example, N$_{ID}^{cell}$ may be N$_{ID}^{cell}$ corresponding to the primary cell.

For example, the terminal can detect N$_{ID}^{cell}$ using synchronization signals. In addition, the terminal can acquire N$_{ID}^{cell}$ from information included in the higher layer signaling (e.g., hand over command) transmitted from the base station.

That is, N$_{ID}^{cell}$ is a parameter related to the reference signal sequence parameter related to the generation of the reference signal sequence). That is, N$_{ID}^{cell}$ is a parameter related to the first reference signal (a parameter related to the generation of the sequence of the first reference signal). In addition, N$_{ID}^{cell}$ is a parameter related to the second reference signal (a parameter related to the generation of the sequence of the second reference signal). In addition, N$_{ID}^{cell}$ is a parameter related to the PUCCH (a parameter related to the generation of the uplink signal to be transmitted on the PUCCH).

In the mathematical expressions given above, additionally, for example, the parameter $\Delta_{ss}$ is denoted by $\Delta_{ss} \in \{0, 1, \dots, 29\}$. The parameter $\Delta_{ss}$ is a cell (base station) specific parameter. For example, the terminal can receive the parameter $\Delta_{ss}$ using SIB2 (System Information Block Type2). SIB2 is a configuration common to (information common to) all the terminals (or, instead, a plurality of terminals) within a cell.

That is, the terminal uses information common to all the terminals within the cell to specify the parameter $\Delta_{ss}$. That is, the parameter $\Delta_{ss}$ is a parameter related to the first reference signal.

In the mathematical expressions given above, additionally, the parameter "X" (the value of the parameter "X") denotes a virtual cell identity (also referred to as a virtual cell identifier). That is, the parameter "X" denotes a UE-specific identity. That is, the parameter "X" denotes a UE-specific parameter.

That is, the parameter "X" is a parameter related to the reference signal sequence. That is, the parameter "X" is a parameter related to the first reference signal. In addition, the parameter "X" is a parameter related to the second reference signal. In addition, the parameter "X" is a parameter related to the PUCCH.

In the mathematical expressions given above, additionally, for example, the parameter "Y" (the value of the parameter "Y") is denoted by "Y" $\in \{0, 1, \dots, 29\}$. Here, the parameter "Y" denotes a UE-specific parameter. That is, the parameter "Y" is a parameter related to the first reference signal.

In the mathematical expressions given above, additionally, the parameter "Z" (the value of the parameter "Z") denotes the initial value of the second m-sequence. Here, the parameter "Z" denotes a UE-specific parameter. That is, the parameter "Z" is a parameter related to the first reference signal.

In the mathematical expressions given above, additionally, the parameter "K" (the value of the parameter "K") denotes the initial value of the second m-sequence. Here, the parameter "K" denotes a UE-specific parameter. That is, the parameter "K" is a parameter related to the PUCCH.

Here, the base station can provide instructions as to whether to enable or disable the sequence group hopping and/or the sequence hopping, using the parameter "M" (the value of the parameter "M"). For example, in a case where the sequence group hopping and/or the sequence hopping are enabled, the parameter "M" is set to "1". In a case where the sequence group hopping and/or the sequence hopping are disabled, the parameter "M" is set to "0". The parameter "M" denotes a UE-specific parameter.

That is, the parameter "M" is a parameter related to the reference signal sequence. That is, the parameter "M" is a parameter related to the first reference signal. In addition, the parameter "M" is a parameter related to the second reference signal.

Here, the base station can configure the parameter "X" to the terminal using the higher layer signaling. For example, the base station can configure the parameter "X" by using the dedicated signal. The base station may configure a plurality of parameters "X" by using the dedicated signal, and indicate one parameter "X" among the configured plurality of parameters "X" using downlink control information transmitted on the PDCCH (e.g., using the information regarding the base sequence index or using the base sequence index associated with the PDCCH).

That is, downlink control information for indicating the parameter "X" is included in the uplink grant. Downlink control information for indicating the parameter "X" may be included in the downlink assignment.

For example, the base station can configure ($X_0$) and ($X_1$) as the plurality of parameters "X", and indicate ($X_0$) or ($X_1$) using downlink control information (e.g., 1-bit information) transmitted on the PDCCH.

In addition, the base station can configure the parameter "Y" to the terminal using the higher layer signaling. For example, the base station can configure the parameter "Y" by using the dedicated signal. The base station may configure a plurality of parameters "Y" by using the dedicated signal, and indicate one parameter "Y" among the configured plurality of parameters "Y" using downlink control information transmitted on the PDCCH (e.g., using the information regarding the base sequence index). That is, downlink control information for indicating the parameter "Y" is included in the uplink grant.

For example, the base station can configure ($Y_0$) and ($Y_1$) as the plurality of parameters "Y", and indicate ($Y_0$) or ($Y_1$) using downlink control information (e.g., 1-bit information) transmitted on the PDCCH.

In addition, the base station can configure the parameter "Z" to the terminal using the higher layer signaling. For example, the base station can configure the parameter "Z" by using the dedicated signal. The base station may configure a plurality of parameters "Z" by using the dedicated signal, and indicate one parameter "Z" among the configured plurality of parameters "Z" using downlink control information transmitted on the PDCCH (e.g., using the information regarding the base sequence index). That is, downlink control information for indicating the parameter "Z" is included in the uplink grant.

For example, the base station can configure ($Z_0$) and ($Z_1$) as the plurality of parameters "Z", and indicate ($Z_0$) or ($Z_1$) using downlink control information (e.g., 1-bit information) transmitted on the PDCCH.

In addition, the base station can configure the parameter "K" to the terminal using the higher layer signaling. For example, the base station can configure the parameter "K" by using the dedicated signal. The base station may configure a plurality of parameters "K" by using the dedicated signal, and indicate one parameter "K" among the configured plurality of parameters "K" using downlink control information transmitted on the PDCCH (e.g., using the information regarding the base sequence index associated with the PUCCH). Downlink control information for indicating the parameter "K" is included in the downlink assignment.

For example, the base station can configure ($K_0$) and ($K_1$) as the plurality of parameters "K", and indicate ($K_0$) or ($K_1$) using downlink control information (e.g., 1-bit information) transmitted on the PDCCH.

In addition, the base station can configure the parameter "M" to the terminal using the higher layer signaling. For example, the base station can configure the parameter "M" by using the dedicated signal. The base station may configure a plurality of parameters "M" by using the dedicated signal, and indicate one parameter "M" among the configured plurality of parameters "M" using downlink control information transmitted on the PDCCH (e.g., using information for giving instructions to enable or disable the sequence group hopping and/or the sequence hopping). That is, downlink control information for indicating the parameter "M" is included in the uplink grant.

For example, the base station can configure ($M_0$) and ($M_1$) as the plurality of parameters "M", and indicate ($M_0$) or ($M_1$) using downlink control information (e.g., 1-bit information) transmitted on the PDCCH.

Furthermore, the base station may configure a plurality of sets of parameters "X" and/or parameters "Y" and/or parameters "Z" and/or parameters "K" and/or parameters "M" by using the dedicated signal, and indicate one set among the configured plurality of sets using downlink control information transmitted on the PDCCH (e.g., using the information regarding the base sequence index, using the information regarding the base sequence index associated with the PUCCH, or using the information for giving instructions to enable or disable the sequence group hopping and/or the sequence hopping).

That is, downlink control information for indicating one set among the plurality of sets is included in the uplink grant. In addition, downlink control information for indicating one set from among the plurality of sets may be included in the downlink assignment.

Here, the parameter "X", the parameter "Y", the parameter "Z", the parameter "K", and the parameter "M" may be independently configured. The parameter "X" and/or the parameter "Y" and/or the parameter "Z" and/or the parameter "K" may be configured in association with each other. For example, by notifying the terminal of only the parameter "X" the base station can indicate the parameter "Y" and/or the parameter "Z" and/or the parameter "K" and/or the parameter "M" associated with the parameter "X".

For example, the association of the parameter "X" with the parameter "Y" and/or the parameter "Z" and/or the parameter "K" and/or the parameter "M" can be defined in advance in accordance with the specifications and so on, and can be set as information known between the base station and the terminal.

In the following, a description is given of a set of parameters which include the parameter "X", the parameter "Y", the parameter "Z", and the parameter "K", for ease of description. A similar embodiment may apply to a set of parameters which include the parameter "X" and/or the parameter "Y" and/or the parameter "Z" and/or the parameter "K".

For example, the base station can configure ($X_0, Y_0, Z_0, K_0$) and ($X_1, Y_1, Z_1, K_1$) as a plurality of sets of parameters, and indicate ($X_0$, $Y_0$, $Z_0$, $K_0$) or ($X_1$, $Y_1$, $Z_1$, $K_1$) using downlink control information (e.g., 1-bit information) transmitted on the PDCCH.

In a case where the parameters ($X_0$, $Y_0$, $Z_0$, $K_0$) are indicate using downlink control information transmitted on the PDCCH, the terminal generates the first reference signal using the parameters ($X_0$, $Y_0$, $Z_0$, $K_0$). In a case where the parameters ($X_1$, $Y_1$, $Z_1$, $K_1$) are indicated using downlink control information transmitted on the PDCCH, the terminal generates the first reference signal using the parameters ($X_1$, $Y_1$, $Z_1$, $K_1$).

In addition, in a case where the parameters ($X_0$, $Y_0$, $Z_0$, $K_0$) are indicated using downlink control information transmitted on the PDCCH, the terminal generates the second reference signal using the parameters ($X_0$, $Y_0$, $Z_0$, $K_0$). In a case where the parameters ($X_1$, $Y_1$, $Z_1$, $K_1$) are indicated using downlink control information transmitted on the PDCCH, the terminal generates the second reference signal using the parameters ($X_1$, $Y_1$, $Z_1$, $K_1$).

Here, the base station can transmit the parameter "M" by including the parameter "M" in each set of parameters. That is, the base station can provide, for each set of parameters, instructions as to whether to enable or disable the sequence group hopping and/or the sequence hopping. For example, the base station can configure ($X_0$, $Y_0$, $Z_0$, $M_0$="1" (enabling)) and ($X_1$, $Y_1$, $Z_1$, $M_1$="0" (disabling)) as a plurality of sets of parameters, and indicate ($X_0$, $Y_0$, $Z_0$, $M_0$="1" (enabling)) or ($X_1$, $Y_1$, $Z_1$, $M_1$="0" (disabling)) using downlink control information (e.g., 1-bit information) transmitted on the PDCCH.

In a case where the parameters ($X_0$, $Y_0$, $Z_0$, $M_0$="1" (enabling)) are indicated using downlink control information transmitted on the PDCCH, the terminal generates the first reference signal using the parameters ($X_0$, $Y_0$, $Z_0$) while enabling the sequence group hopping. In a case where the parameters ($X_1$, $Y_1$, $Z_1$, $M_1T_1$="0" (disabling)) are indicated using downlink control information transmitted on the PDCCH, the terminal generates the first reference signal using the parameters ($X_1$, $Y_1$, $Z_1$) while disabling the sequence group hopping.

In the following, downlink control information for indicating the parameter "X" and/or downlink control information for indicating the parameter "Y" and/or downlink control information for indicating the parameter "Z" and/or downlink control information for indicating the parameter "K" and/or downlink control information for indicating the set of parameters are described as downlink control information for indicating parameters, for ease of description.

Here, the downlink control information for indicating parameters may be included in the uplink grant only when the parameters are configured by the base station using the higher layer signaling. In addition, the downlink control information for indicating the parameters may be included in the downlink assignment only when the parameters are configured by the base station using the higher layer signaling.

For example, the base station may indicate Whether the downlink control information for indicating the parameters is included in the uplink grant, by using the dedicated signal. The base station may indicate whether the downlink control information for indicating the parameters is included in the downlink assignment, by using the dedicated signal.

In addition, the base station may indicate whether the downlink control information for indicating the parameters is included in the uplink grant, by configuring a downlink transmission mode (e.g., a PDSCH transmission mode) and/or an uplink transmission mode (e.g., a PUSCH transmission mode) by using the dedicated signal. The base station may indicate whether the downlink control information for indicating the parameters is included in the downlink assignment, by configuring the downlink transmission mode and/or the uplink transmission mode by using the dedicated signal.

That is, the terminal can identify the downlink control information for indicating the parameters as being included in the uplink grant only when a specific downlink transmission mode and/or a specific uplink transmission mode are configured. In addition, the terminal can identify the downlink control information for indicating the parameters as being included in the downlink assignment only when the specific downlink transmission mode and/or the specific uplink transmission mode are configured.

The specific downlink transmission mode and/or the uplink transmission mode can be defined in advance in accordance with the specifications and so on, and can be set as information known between the base station and the terminal.

In addition, the base station may perform configuration (give instructions) to include in the uplink grant the downlink control information for indicating the parameters and to include in the downlink assignment the downlink control information for indicating the parameters, by using a single piece of information. For example, the base station may transmit the single piece of information by using the dedicated signal. In addition, the base station may transmit the downlink transmission mode and/or the uplink transmission mode as the single piece of information.

In addition, the base station may include the downlink control information for indicating the parameters only in the uplink grant transmitted in the user-equipment-specific search space. In addition, the base station may include the downlink control information for indicating the parameters only in the downlink assignment transmitted in the user-equipment-specific search space.

In addition, default values may be configured in the downlink control information for indicating the parameters. That is, the terminal may use the default values until parameters are configured by the base station. The default values can be defined in advance in accordance with the specifications and so on, and can be set as information known between the base station and the terminal.

For example, the default value of the parameter "X" may be equal to $N_{ID}^{cell}$. In addition, the default value of the parameter "Y" may be the value of the parameter $\Delta_{ss}$. The default value of the parameter "Y" may be specified by the base station using SIB2. The default value of the parameter "Y" may be equal to "0". The default value of the parameter "Z" may be calculated in accordance with mathematical expression 17(1). In mathematical expression 17(1), $f_{ss}$-$^{PUSCH}$ may be calculated on the basis of the parameter $\Delta_{ss}$ specified by the base station using SIB2. In addition, the default value of the parameter "K" may be equal to $N_{ID}^{cell}$ (e.g., $N_{ID}^{cell}$ corresponding to the primary cell). In addition, the default value of the parameter "M" may be equal to "disabling".

In the following, the physical layer cell identity $N_{ID}^{cell}$ and/or the parameter $\Delta_{ss}$ are also represented as first parameters. In addition, the parameter "X" and/or the parameter "Y" and/or the parameter "Z" and/or the parameter "K" and/or the parameter "M" are also represented as second parameters.

Figure 5:
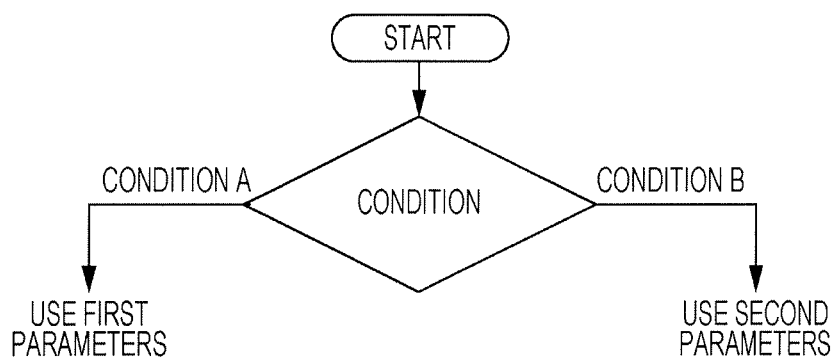
FIG. 5 is a diagram explaining the embodiment of the present invention.

As illustrated in FIG. 5, the terminal identifies a condition, and switches parameters related to the first reference signal (or, instead, related to the generation of the sequence of the first reference signal) on the basis of the condition. Specifically, if the condition is A, the terminal generates the first reference signal using the first parameters in the mathematical expressions given above.

In addition, the terminal identifies the condition, and switches parameters related to the second reference signal (or, instead, related to the generation of the sequence of the second reference signal) on the basis of the condition. Specifically, if the condition is A, the terminal generates the second reference signal using the first parameters in the mathematical expressions given above.

In addition, the terminal identifies the condition, and switches parameters related to the PUCCH (or, instead, related to the generation of the uplink signal to be transmitted on the PUCCH) on the basis of the condition. Specifically, if the condition is A, the terminal generates the uplink signal to be transmitted on the PUCCH using the first parameters in the mathematical expressions given above.

Specifically, if the condition is A, the terminal maps the first reference signal (or, instead, part of the sequence of the first reference signal) generated using the first parameters to resource elements in the resource blocks allocated for PUSCH transmission (transmission on the PUSCH).

In addition, if the condition is A, the terminal maps the second reference signal (or, instead, part of the sequence of the second reference signal) generated using the first parameters to resource elements in the resource blocks allocated for PUCCH transmission (transmission on the PUCCH).

In addition, if the condition is A, the terminal maps the uplink signal generated using the first parameters to resource elements in the resource blocks allocated for PUCCH transmission (transmission on the PUCCH).

In addition, the base station identifies the condition, and switches parameters related to the first reference signal (or, instead, related to the generation of the sequence of the first reference signal) on the basis of the condition. Specifically, if the condition is A, the base station assumes that the first reference signal is generated using the first parameters in the mathematical expressions given above.

In addition, the base station identifies the condition, and switches parameters related to the second reference signal (or, instead, related to the generation of the sequence of the second reference signal) on the basis of the condition. Specifically, if the condition is A, the base station assumes that the second reference signal is generated using the first parameters in the mathematical expressions given above.

In addition, the base station identifies the condition, and switches parameters related to the PUCCH (or, instead, related to the generation of the uplink signal to be transmitted on the PUCCH) on the basis of the condition. Specifically, if the condition is A, the base station assumes that the uplink signal to be transmitted on the PUCCH is generated using the first parameters in the mathematical expressions given above.

Specifically, if the condition is A, the base station assumes that the first reference signal (or, instead, part of the sequence of the first reference signal) generated using the first parameters is mapped to resource elements in the resource blocks allocated for PUSCH transmission (transmission on the PUSCH).

In addition, if the condition is A, the base station assumes that the second reference signal (or, instead, part of the sequence of the second reference signal) generated using the first parameters is mapped to resource elements in the resource blocks allocated for PUCCH transmission (transmission on the PUCCH).

In addition, if the condition is A, the base station assumes that the uplink signal generated using the first parameters is mapped to resource elements in the resource blocks allocated for PUCCH transmission (transmission on the PUCCH).

If the condition is B, the terminal generates the first reference signal using the second parameters in the mathematical expressions given above. In addition, if the condition is B, the terminal generates the second reference signal using the second parameters in the mathematical expressions given above. In addition, if the condition is B, the terminal generates the uplink signal to be transmitted on the PUCCH using the second parameters in the mathematical expressions given above.

Specifically, if the condition is B, the terminal maps the first reference signal (or, instead, part of the sequence of the first reference signal) generated using the second parameters to resource elements in the resource blocks allocated for PUSCH transmission (transmission on the PUSCH).

In addition, if the condition is B, the terminal maps the second reference signal (or, instead, part of the sequence of the second reference signal) generated using the second parameters to resource elements in the resource blocks allocated for PUCCH transmission (transmission on the PUCCH).

In addition, if the condition is B, the terminal maps the uplink signal generated using the second parameters to resource elements in the resource blocks allocated for PUCCH transmission (transmission on the PUCCH).

In addition, if the condition is B, the base station assumes that the first reference signal is generated using the second parameters in the mathematical expressions given above. In addition, if the condition is B, the terminal assumes that the second reference signal is generated using the second parameters in the mathematical expressions given above. In addition, if the condition is B, the terminal assumes that the uplink signal to be transmitted on the PUCCH is generated using the second parameters in the mathematical expressions given above.

Specifically, if the condition is B, the base station assumes that the first reference signal (or, instead, part of the sequence of the first reference signal) generated using the second parameters is mapped to resource elements in the resource blocks allocated for PUSCH transmission (transmission on the PUSCH).

In addition, if the condition is B, the base station assumes that the second reference signal (or, instead, part of the sequence of the second reference signal) generated using the second parameters is mapped to resource elements in the resource blocks allocated for PUCCH transmission (transmission on the PUCCH).

In addition, if the condition is B, the base station assumes that the uplink signal generated using the second parameters is mapped to resource elements in the resource blocks allocated for PUCCH transmission (transmission on the PUCCH).

The condition A includes that the PDCCH is detected (decoded) in the CSS. Specifically, in a case where the PDCCH is detected in the CSS, the terminal transmits the first reference signal generated using the first parameters. In addition, in a case where the PDCCH is detected in the CSS, the terminal transmits the second reference signal generated using the first parameters. In addition, in a case where the PDCCH is detected in the CSS, the terminal transmits on the PUCCH the uplink signal generated using the first parameters.

In addition, in a case where the PDCCH is allocated in the CSS, the base station receives the first reference signal generated using the first parameters. In addition, in a case where the PDCCH is allocated in the CSS, the base station receives the second reference signal generated using the first parameters. In addition, in a case where the PDCCH is allocated in the CSS, the base station receives on the PUCCH the uplink signal generated using the first parameters.

Specifically, in a case where the PDCCH is detected in the CSS, the terminal transmits the first reference signal generated using $N_{ID}^{cell}$. In addition, in a case where the PDCCH is detected in the CSS, the terminal transmits the second reference signal generated using $N_{ID}^{cell}$. In addition, in a case where the PDCCH is detected in the CSS, the terminal transmits on the PUCCH the uplink signal generated using $N_{ID}^{cell}$. In addition, in a case where the PDCCH is detected in the CSS, the terminal transmits the first reference signal generated using the parameter $\Delta_{ss}$.

The condition B includes that the PDCCH is detected (decoded) in the USS. Specifically, in a case where the PDCCH is detected in the USS, the terminal transmits the first reference signal generated using the second parameters. In addition, in a case where the PDCCH is detected in the USS, the terminal transmits the second reference signal generated using the second parameters. In addition, in a case where the PDCCH is detected in the USS, the terminal transmits on the PUCCH the uplink signal generated using the second parameters.

In addition, in a case where the PDCCH is allocated in the USS, the base station receives the first reference signal generated using the second parameters. In addition, in a case where the PDCCH is allocated in the USS, the base station receives the second reference signal generated using the second parameters. In addition, in a case where the PDCCH is allocated in the USS, the base station receives on the PUCCH the uplink signal generated using the second parameters.

Specifically, in a case where the PDCCH is detected in the USS, the terminal transmits the first reference signal generated using the parameter "X". In addition, in a case where the PDCCH is detected in the USS, the terminal transmits the first reference signal generated using the parameter "Y". In addition, in a case where the PDCCH is detected in the USS, the terminal transmits the first reference signal generated using the parameter "Z".

In addition, in a case where the PDCCH is detected in the USS, the terminal transmits the second reference signal generated using the parameter "X". In addition, in a case where the PDCCH is detected in the USS, the terminal transmits on the PUCCH the uplink signal generated using the parameter "X". In addition, in a case where the PDCCH is detected in the USS, the terminal transmits the second reference signal generated using the parameter "K". In addition, in a case where the PDCCH is detected in the USS, the terminal transmits on the PUCCH the uplink signal generated using the parameter "K".

Here, the downlink control information for indicating the parameters (e.g., the information regarding the base sequence index or the information regarding the base sequence index associated with the PUCCH) is transmitted on the PDCCH in the USS.

That is, the terminal transmits, to the base station, the first reference signal generated using a different method (using a different parameter) on the basis of the search space in which the PDCCH is detected. That is, the terminal generates the first reference signal using a different method on the basis of whether the PDCCH is detected in the CSS or in the USS.

In addition, the terminal transmits, to the base station, the second reference signal generated using a different method on the basis of the search space in which the PDCCH is detected. That is, the terminal generates the second reference signal using a different method on the basis of whether the PDCCH is detected in the CSS or in the USS.

In addition, the terminal further transmits on the PUCCH the uplink signal generated using a different method on the basis of the search space in which the PDCCH is detected. That is, the terminal transmits on the PUCCH the uplink signal generated using a different method on the basis of whether the PDCCH is detected in the CSS or in the USS.

In addition, the condition A includes that the PDCCH with the CRC scrambled by the Temporary C-RNTI is detected (decoded). Specifically, in a case where the PDCCH with the CRC scrambled by the Temporary C-RNTI is detected, the terminal transmits the first reference signal generated using the first parameters. In addition, in a case where the PDCCH with the CRC scrambled by the Temporary C-RNTI is detected, the terminal transmits the second reference signal generated using the first parameters. In addition, in a case where the PDCCH with the CRC scrambled by the Temporary C-RNTI is detected, the terminal transmits on the PUCCH the uplink signal generated using the first parameters.

In addition, in a case where the PDCCH with the CRC scrambled by the Temporary C-RNTI is allocated, the base station receives the first reference signal generated using the first parameters. In addition, in a case where the PDCCH with the CRC scrambled by the Temporary C-RNTI is allocated, the base station receives the second reference signal generated using the first parameters. In addition, in a case where the PDCCH with the CRC scrambled by the Temporary C-RNTI is allocated, the base station receives on the PUCCH the uplink signal generated using the first parameters.

Specifically, in a case where the PDCCH with the CRC scrambled by the Temporary C-RNTI is detected, the terminal transmits the first reference signal generated using $N_{ID}^{cell}$. In addition, in a case where the PDCCH with the CRC scrambled by the Temporary C-RNTI is detected, the terminal transmits the second reference signal generated using $N_{ID}^{cell}$. In addition, in a case where the PDCCH with the CRC scrambled by the Temporary C-RNTI is detected, the terminal transmits on the PUCCH the uplink signal generated using $N_{ID}^{cell}$. In addition, in a case where the PDCCH with the CRC scrambled by the Temporary C-RNTI is detected, the terminal transmits the first reference signal generated using the parameter $\Delta_{ss}$.

In addition, the condition B includes that the PDCCH with the CRC scrambled by the C-RNTI is detected (decoded). Specifically, in a case where the PDCCH with the CRC scrambled by the C-RNTI is detected, the terminal transmits the first reference signal generated using the second parameters. In addition, in a case where the PDCCH with the CRC scrambled by the C-RNTI is detected, the terminal transmits the second reference signal generated using the second parameters. In addition, in a case where the PDCCH with the CRC scrambled by the C-RNTI is detected, the terminal transmits on the PUCCH the uplink signal generated using the second parameters.

In addition, in a case where the PDCCH with the CRC scrambled by the C-RNTI is allocated, the base station receives the first reference signal generated using the second parameters. In addition, in a case where the PDCCH with the CRC scrambled by the C-RNTI is allocated, the base station receives the second reference signal generated using the second parameters. In addition, in a case where the PDCCH with the CRC scrambled by the C-RNTI is allocated, the base station receives on the PUCCH the uplink signal generated using the second parameters.

Specifically, in a case where the PDCCH with the CRC scrambled by the C-RNTI is detected, the terminal transmits the first reference signal generated using the parameter "X". In addition, in a case where the PDCCH with the CRC scrambled by the C-RNTI is detected, the terminal transmits the first reference signal generated using the parameter "Y". In addition, in a case where the PDCCH with the CRC scrambled by the C-RNTI is detected, the terminal transmits the first reference signal generated using the parameter "Z". In addition, in a case where the PDCCH with the CRC scrambled by the C-RNTI is detected, the terminal transmits the second reference signal generated using the parameter X. In addition, in a case where the PDCCH with the CRC scrambled by the C-RNTI is detected, the terminal transmits on the PUCCH the uplink signal generated using the parameter "X". In addition, in a case where the PDCCH with the CRC scrambled by the C-RNTI is detected, the terminal transmits the second reference signal generated using the parameter "K". In addition, in a case Where the PDCCH with the CRC scrambled by the C-RNTI is detected, the terminal transmits on the PUCCH the uplink signal generated using the parameter "K".

Here, the downlink control information for indicating the parameters (e.g., the information regarding the base sequence index or the information regarding the base sequence index associated with the PUCCH) is transmitted on the PDCCH with the CRC scrambled by the C-RNTI.

That is, the terminal transmits, to the base station, the first reference signal generated using a different method (using a different parameter) on the basis of the RNTI by which the CRC is scrambled. That is, the terminal generates the first reference signal using a different method on the basis of whether the CRC is scrambled by the Temporary C-RNTI or by the C-RNTI.

In addition, the terminal transmits, to the base station, the second reference signal venerated using a different method on the basis of the RNTI by which the CRC is scrambled. That is, the terminal generates the second reference signal using a different method on the basis of Whether the CRC is scrambled by the Temporary C-RNTI or by the C-RNTI.

In addition, the terminal transmits on the PUCCI-I the uplink signal generated using a different method on the basis of the RNTI by which the CRC is scrambled. That is, the terminal generates a PDCCH signal using a different method on the basis of whether the CRC is scrambled by the Temporary C-RNTI or by the C-RNTI.

The condition A may also include that the PDCCH with the CRC scrambled by the C-RNTI or the Temporary C-RNTI is detected (decoded) in the CSS. Specifically, in a case where the PDCCH with the CRC scrambled by the C-RNTI or the Temporary C-RNTI is detected in the CSS, the terminal transmits the first reference signal generated using the first parameters. In addition, in a case where the PDCCH with the CRC scrambled by the C-RNTI or the Temporary C-RNTI is detected in the CSS, the terminal transmits the second reference signal generated using the first parameters. In addition, in a case where the PDCCH with the CRC scrambled by the C-RNTI or the Temporary C-RNTI is detected in the CSS, the terminal transmits on the PDCCH the uplink signal generated using the first parameters.

In addition, in a case where the PDCCH with the CRC scrambled by the C-RNTI or the Temporary C-RNTI is allocated in the CSS, the base station receives the first reference signal generated using the first parameters. In addition, in a case where the PDCCH with the CRC scrambled by the C-RNTI or the Temporary C-RNTI is allocated in the CSS, the base station receives the second reference signal generated using the first parameters. In addition, in a case where the PDCCH with the CRC scrambled by the C-RNTI or the Temporary C-RNTI is allocated in the CSS, the base station receives on the PUCCH the uplink signal generated using the first parameters.

Specifically, in a case where the PDCCH with the CRC scrambled by the C-RNTI or the Temporary C-RNTI is detected in the CSS, the terminal transmits the first reference signal generated using $N_{ID}^{cell}$. In addition, in a case where the PDCCH with the CRC scrambled by the C-RNTI or the Temporary C-RNTI is detected in the CSS, the terminal transmits the second reference signal generated using $N_{ID}^{cell}$. In addition, in a case where the PDCCH with the CRC scrambled by the C-RNTI or the Temporary C-RNTI is detected in the CSS, the terminal transmits on the PUCCH the uplink signal generated using $N_{ID}^{cell}$. In addition, in a case where the PDCCH with the CRC scrambled by the C-RNTI or the Temporary C-RNTI is detected in the CSS, the terminal transmits the first reference signal generated using the parameter $\Delta_{ss}$.

The condition B may also include that the PDCCH with the CRC scrambled by the C-RNTI is detected (decoded) in the USS. Here, for example, the PDCCH with the CRC scrambled by the Temporary C-RNTI is allocated only in the CSS. Specifically, in a case where the PDCCH with the CRC scrambled by the C-RNTI is detected in the USS, the terminal transmits the first reference signal generated using the second parameters. In addition, in a case where the PDCCH with the CRC scrambled by the C-RNTI is detected in the USS, the terminal transmits the second reference signal generated using the second parameters. In addition, in a case where the PDCCH with the CRC scrambled by the C-RNTI is detected in the USS, the terminal transmits on the PUCCH the uplink signal generated using the second parameters.

In addition, in a case where the PDCCH with the CRC scrambled by the C-RNTI is allocated in the USS, the base station receives the first reference signal generated using the second parameters. In addition, in a case Where the PDCCH with the CRC scrambled by the C-RNTI is allocated in the USS, the base station receives the second reference signal generated using the second parameters. In addition, in a case where the PDCCH with the CRC scrambled by the C-RNTI is allocated in the USS, the base station receives on the PUCCH the uplink signal generated using the second parameters.

Specifically, in a case where the PDCCH with the CRC scrambled by the C-RNTI is detected in the USS, the terminal transmits the first reference signal generated using the parameter "X". In addition, in a case where the PDCCH with the CRC scrambled by the C-RNTI is detected in the USS, the terminal transmits the first reference signal generated using the parameter "Y". In addition, in a case where the PDCCH with the CRC scrambled by the C-RNTI is detected in the USS, the terminal transmits the first reference signal generated using the parameter "Z".

In addition, in a case where the PDCCH with the CRC scrambled by the C-RNTI is detected in the USS, the terminal transmits the second reference signal generated using the parameter "X". In addition, in a case where the PDCCH with the CRC scrambled by the C-RNTI is detected in the USS, the terminal transmits on the PUCCH the uplink signal generated using the parameter "X". In addition, in a case where the PDCCH with the CRC scrambled by the C-RNTI is detected in the USS, the terminal transmits the second reference signal generated using the parameter "K". In addition, in a case where the PDCCH with the CRC scrambled by the C-RNTI is detected in the USS, the terminal transmits on the PUCCH the uplink signal generated using the parameter "K".

Here, the downlink control information for indicating the parameters (e.g., the information regarding the base sequence index or the information regarding the base sequence index associated with the PUCCH) is transmitted on the PDCCH, in the USS, with the CRC scrambled by the C-RNTI.

That is, the terminal transmits, to the base station, the first reference signal generated using a different method (using a different parameter) on the basis of the search space in which the PDCCH is detected and on the basis of the RNTI by which the CRC is scrambled. In addition, the terminal transmits, to the base station, the second reference signal generated using a different method on the basis of the search space in which the PDCCH is detected and on the basis of the RNTI by which the CRC is scrambled. In addition, the terminal transmits on the PUCCH the uplink signal generated using a different method on the basis of the search space in which the PDCCH is detected and on the basis of the RNTI by which the CRC is scrambled.

In addition, the condition A includes that a predetermined DCI format (hereinafter referred to as a first DCI format is received (detected, decoded). The first DCI format may be information that is defined in advance in accordance with the specifications and so on and that is known between the base station and the terminal. For example, the first DCI format includes the DCI format 0. The DCI format 0 is transmitted on the PDCCH in the CSS and/or the USS.

That is, in a case where the first DCI format is received, the terminal transmits the first reference signal generated using the first parameters. In addition, in a case where the first DCI format is received, the terminal transmits the second reference signal generated using the first parameters. In addition, in a case where the first DCI format is received, the terminal transmits on the PUCCH the uplink signal generated using the first parameters.

In addition, in a case where the first DCI format is transmitted, the base station receives the first reference signal generated using the first parameters. In addition, in a case where the first DCI format is transmitted, the base station receives the second reference signal generated using the first parameters. In addition, in a case where the first DCI format is transmitted, the base station receives on the PUCCH the uplink signal generated using the first parameters.

Specifically, in a case where the first DCI format is received, the terminal transmits the first reference signal generated using $N_{ID}^{cell}$. In addition, in a case where the first DCI format is received, the terminal transmits the second reference signal generated using $N_{ID}^{cell}$. In addition, in a case where the first DCI format is received, the terminal transmits on the PUCCH the uplink signal generated using $N_{ID}^{cell}$. In addition, in a case where the first DCI format is received, the terminal transmits the first reference signal generated using the parameter $\Delta_{ss}$.

In addition, the condition B includes that a DCI format other than the predetermined DCI format (hereinafter referred to as a second. DCI format) is received (detected). For example, the second. DCI format includes the DCI format 4. The DCI format 4 is transmitted on only the PDCCH in the USS.

That is, in a case where the second DCI format is received, the terminal transmits the first reference signal generated using the second parameters. In addition, in a case where the second DCI format is received, the terminal transmits the second reference signal generated using the second parameters. In addition, in a case where the second DCI format is received, the terminal transmits on the PUCCH the uplink signal generated using the second parameters.

In addition, in a case where the second DCI format is transmitted, the base station receives the first reference signal generated using the second parameters. In addition, in a case where the second DCI format is transmitted, the base station receives the second reference signal generated using the second parameters. In addition, in a case where the second DCI format is transmitted, the base station receives on the PUCCH the uplink signal generated using the second parameters.

Specifically, in a case where the second DCI format is received, the terminal transmits the first reference signal generated using the parameter "X". In addition, in a case where the second DCI format is received, the terminal transmits the first reference signal generated using the parameter "Y". In addition, in a case where the second DCI format is received, the terminal transmits the first reference signal generated using the parameter "Z".

In addition, in a case where the second DCI format is received, the terminal transmits the second reference signal generated using the parameter "X". In addition, in a case where the second. DCI format is received, the terminal transmits on the PUCCH the uplink signal generated using the parameter "X". In addition, in a case where the second DCI format is received, the terminal transmits the second reference signal generated using the parameter "K". In addition, in a case where the second DCI format is received, the terminal transmits on the PUCCH the uplink signal generated using the parameter "K".

Here, the downlink control information for indicating the parameters (e.g., the base sequence index or the base sequence index associated with the PUCCH) is included in the second DCI format and is transmitted.

That is, the terminal transmits, to the base station, the first reference signal generated using a different method (using a different parameter) on the basis of the received DCI format. In addition, the terminal transmits, to the base station, the second reference signal generated using a different method on the basis of the received DCI format. In addition, the terminal performs transmission on the PUCCH generated using a different method on the basis of the received DCI format.

That is, the terminal transmits a first reference signal generated using a different method (using a different parameter) on the basis of the DCI format, the search space in which a PDCCH has been detected, and the RNTI scrambled with the CRC to the base station.

In addition, the terminal transmits, to the base station, the second reference signal generated using a different method on the basis of the DCI format, the search space in which the PDCCH is detected, and the RNTI by which the CRC is scrambled.

In addition, the terminal transmits on the PUCCH the uplink signal generated using a different method on the basis of the DCI format, the search space in which the PDCCH is detected, and the RNTI by which the CRC is scrambled.

In addition, the condition A includes that an initial transmission of the transport block (UL-SCH or uplink transport block) on the PUSCH scheduled by the random access response grant is performed.

That is, in a case where the initial transmission of the transport block on the PUSCH scheduled by the random access response grant is performed, the terminal transmits the first reference signal generated using the first parameters.

In addition, the terminal can identify the condition, and switch between generation of the first reference signal (generation of the sequence of the first reference signal) based on a third parameter and generation of the first reference signal based on a fourth parameter. Specifically, if the condition is A, the terminal generates the first reference signal on the basis of the third parameter. If the condition is B, the terminal generates the first reference signal on the basis of the fourth parameter. The condition A and the condition B are as described above.

The third parameter is a parameter that is configured to be cell-specific. For example, the third parameter is specified using SIB2. For example, the third parameter includes the information regarding the enabling or disabling of the sequence group hopping. In addition, the third parameter includes the information regarding the enabling or disabling of the sequence hopping.

The fourth parameter is a parameter that is configured to be UE-specific. For example, the fourth parameter is indicated using the DCI format. The fourth parameter may also be configured using the dedicated signal. For example, the fourth parameter includes the configuration regarding the enabling or disabling of the sequence group hopping. In addition, the fourth parameter includes the information regarding the enabling or disabling of the sequence hopping. That is, the fourth parameter includes the parameter "M" described above.

For example, if the condition is A, the terminal enables or disables the sequence group hopping on the basis of the third parameter (the value of the third parameter), and generates the first reference signal. Specifically, if the condition is A, the terminal determines whether to perform hopping on the groups of the first reference signal sequence on a slot-by-slot basis on the basis of the third parameter.

If the condition is A, additionally, the terminal enables or disables the sequence hopping on the basis of the third parameter (the value of the third parameter), and generates the first reference signal. Specifically, if the condition is A, the terminal determines whether to perform hopping on the sequences of the first reference signal within the group on a slot-by-slot basis on the basis of the third parameter.

If the condition is B, the terminal enables or disables the sequence group hopping on the basis of the fourth parameter (the value of the fourth parameter), and generates the first reference signal. Specifically, if the condition is B, the terminal determines Whether to perform hopping on the groups of the first reference signal sequence on a slot-by-slot basis on the basis of the fourth parameter.

If the condition is B, additionally, the terminal enables or disables the sequence hopping on the basis of the fourth parameter (the value of the fourth parameter), and generates the first reference signal. Specifically, if the condition is B, the terminal determines whether to perform hopping on the sequences of the first reference signal within the group on a slot-by-slot basis on the basis of the fourth parameter.

In addition, the base station can identify the condition, and switch between the assumption that the first reference signal is generated (the sequence of the first reference signal is generated) on the basis of the third parameter and the assumption that the first reference signal is generated on the basis of the fourth parameter. Specifically, if the condition is A, the base station assumes that the first reference signal is generated on the basis of the third parameter. If the condition is B, the base station assumes that the first reference signal is generated on the basis of the fourth parameter. The condition A and the condition B are as described above.

For example, if the condition is A, the base station enables or disables the sequence group hopping on the basis of the third parameter (the value of the third parameter), and receives the first reference signal. If the condition is A, additionally, the base station enables or disables the sequence hopping on the basis of the third parameter (the value of the third parameter), and receives the first reference signal.

If the condition is B, the base station enables or disables the sequence group hopping on the basis of the fourth parameter (the value of the fourth parameter), and receives the first reference signal. If the condition is B, additionally, the base station enables or disables the sequence hopping on the basis of the fourth parameter (the value of the fourth parameter), and receives the first reference signal.

Specifically, in a case where the PDCCH is detected in the CSS, the terminal determines whether to perform hopping on the groups of the reference signal sequence on a slot-by-slot basis on the basis of the third parameter. In a case where the PDCCH is detected in the USS, the terminal determines whether to perform hopping on the groups of the reference signal sequence on a slot-by-slot basis on the basis of the fourth parameter.

In addition, in a case where the PDCCH is allocated in the CSS, the base station configures whether to perform hopping on the groups of the reference signal sequence on a slot-by-slot basis on the basis of the third parameter. In a case where the PDCCH is allocated in the USS, the base station configures whether to perform hopping on the groups of the reference signal sequence on a slot-by-slot basis on the basis of the fourth parameter.

The reference signal sequence includes the sequence of the demodulation reference signal associated with transmission of the PUSCH. In addition, the third parameter is configured to be cell-specific. In addition, the fourth parameter is configured to be terminal-specific (user-equipment-specific; UE-specific).

Using the method described above, it is possible to transmit and receive the reference signals while, for example, more flexibly switching between the sequences. In addition, using the method described above, it is possible to transmit and receive the reference signals while more dynamically switching between the sequences.

For example, it is possible to transmit and receive the reference signals using the condition A within a period during which the base station and the terminal perform configuration in the RRC layer. That is, it is possible to transmit and receive the reference signals using the condition A within a period during which ambiguous (unclear) configurations are provided (a period during which configurations are inconsistent between the base station and the terminal), which occurs in the configuration in the RRC layer.

As described above, in the case of the condition A, the terminal generates the reference signals using the cell-specific parameters. That is, continuous communication is possible even within a period during which the base station and the terminal perform configuration in the RRC layer, and it is possible to achieve communication with efficient use of radio resources.

In addition, using the method described above, it is possible to transmit and receive the uplink signal while, for example, more flexibly switching between the sequences. In addition, using the method described above, it is possible to transmit and receive the uplink signal while more dynamically switching between the sequences.

For example, it is possible to transmit and receive the uplink signal using the condition A within a period during which the base station and the terminal perform configuration in the RRC layer. That is, it is possible to transmit and receive the uplink signal using the condition A within a period during which ambiguous (unclear) configurations are provided (a period during which configurations are inconsistent between the base station and the terminal), which occurs in the configuration in the RRC layer.

As described above, in the case of the condition A, the terminal generates the uplink signal using the cell-specific parameters. That is, continuous communication is possible even within a period during which the base station and the terminal perform configuration in the RRC layer, and it is possible to achieve communication with efficient use of radio resources.

A program executable on a primary base station, a secondary base station, and a terminal according to the present invention is a program (a program for causing a computer to function) for controlling a CPU and so on to implement the functions in the foregoing embodiments according to the present invention. Information handled by these devices is temporarily accumulated in a RAM when it is processed, and is then stored in various ROMs or HDDs. The program is read, modified, and written by the CPU, as necessary. A recording medium storing the program may be a semiconductor medium (e.g., a ROM, a non-volatile memory card, etc.), an optical recording medium (e.g., a DVD, an MO, an MD, a CD, a BD, etc.), or a magnetic recording medium (e.g., a magnetic tape, a flexible disk, etc.). Furthermore, the loaded program is executed to implement the functions in the embodiments described above. In addition, in sonic cases, the functions in the present invention may be implemented by processing, in accordance with the instructions of the program, the program in cooperation with an operating system, any other application program, or the like.

In order to distribute the program in a market, the program may be stored in portable recording media for distribution, or may be transferred to a server computer connected via a network such as the Internet. In this case, a storage device in the server computer is also embraced by the present invention. In addition, part or all of a primary base station, a secondary base station, and a terminal in the embodiments described above may be implemented as an LSI, which is typically an integrated circuit. The respective functional blocks of the primary base station, the secondary base station, and the terminal may be built into individual chips, or some or all of them may be integrated and built into a chip. The implementation of the method for forming an integrated circuit is not limited to LSI, and the method may be implemented by dedicated circuitry, a general-purpose processor, or the like. Additionally, in the case of the advent of integrated circuit technology replacing LSI due to the advancement of semiconductor technology, it is also possible to use an integrated circuit based on this technology.

While embodiments of this invention have been described in detail with reference to the drawings, specific configurations are not limited to those of the embodiments, and any design changes and the like can be made without departing from the scope of this invention. Additionally, a variety of changes can be made to the present invention within the claims thereof, and embodiments obtained by combining technical means disclosed in different embodiments, as appropriate, are also within the technical scope of the present invention. Configurations including elements that are described in the foregoing embodiments, in which elements achieving similar advantages are interchanged, are also encompassed by the present invention.

INDUSTRIAL APPLICABILITY

The present invention is suitable for a mobile station device, a base station device, a communication method, a wireless communication system, and an integrated circuit.

DESCRIPTION OF REFERENCE NUMERALS 100 base station
101 data control unit
102 transmit data modulation unit
103 radio unit
104 scheduling unit
105 channel estimation unit
106 received data demodulation unit
107 data extraction unit
108 higher layer
109 antenna
200 terminal
201 data control unit
202 transmit data modulation unit
203 radio unit
204 scheduling unit
205 channel estimation unit
206 received data demodulation unit
207 data extraction unit
208 higher layer
209 antenna
301 primary base station
302 secondary base station
303, 304 terminal
305, 306, 307, 308 uplink

The invention claimed is:

1. A terminal device comprising:
receiving circuitry configured to receive, from a base station device, by using a radio resource control (RRC) signal, more than one values of parameters related to an initialization of a pseudo random sequence for generation of a sequence of a demodulation reference signal (DMRS) associated with transmission of a physical uplink shared channel (PUSCH); and
transmitting circuitry configured to transmit, to the base station device, the DMRS associated with the transmission of the PUSCH, the sequence of the DMRS associated with the transmission of the PUSCH being given by using the pseudo random sequence, wherein
the pseudo random sequence is initialized based on a value of a parameter, in a case that the PUSCH is scheduled by using a first downlink control information (DCI) formal, the value of the parameter being indicated from the more than one values of the parameters by using downlink control information included in the first DCI format, and
the pseudo random sequence is initialized based on a physical cell identity, in a case that the PUSCH is scheduled by using a second DCI format.

2. The terminal device according to claim 1, wherein
the first DCI format is transmitted on a physical downlink control channel (PDCCH) in a LIE-specific search space (USS), and
the second DCI format is transmitted on a PDCCH in a common search space (CSS).

3. A base station device comprising:
transmitting circuitry configured to transmit, to a terminal device, by using a radio resource control (RRC) signal, more than one values of parameters related to an initialization of a pseudo random sequence for generation of a sequence of a demodulation reference signal (DMRS) associated with transmission of a physical uplink shared channel (PUSCH); and
receiving circuitry configured to receive, from the base station device, the DMRS associated with the transmission of the PUSCH, the sequence of the DMRS associated with the transmission of the PUSCH being given by using the pseudo random sequence, wherein
the pseudo random sequence is initialized based on a value of a parameter, in a case that the PUSCH is scheduled by using a first downlink control information (DCI) format, the value of the parameter being indicated from the more than one values of the parameters by using downlink control information included in the first DCI format, and
the pseudo random sequence is initialized based on a physical cell identity, in a case that the PUSCH is scheduled by using a second DCI format.

4. The base station device according to claim 3, wherein
the first DCI format is transmitted on a physical downlink control channel (PDCCH) in a UE-specific search space (USS), and
the second DCI format is transmitted on a PDCCH in a common search space (CSS).

5. A communication method of a terminal device comprising:
receiving, from a base station device, by using a radio resource control (RRC) more than one values of parameters related to an initialization of a pseudo random sequence for generation of a sequence of a demodulation reference signal (DMRS) associated with transmission of a physical uplink shared channel (PUSCH); and
transmitting, to the base station device, the DMRS associated with the transmission of the PUSCH, the sequence of the DMRS associated with the transmission of the PUSCH being given by using the pseudo random sequence, wherein
the pseudo random sequence is initialized based on a value of a parameter, in a case that the PUSCH is scheduled by using a first downlink control information (DCI) format, the value of the parameter being indicated from the more than one values of the parameters by using downlink control information included in the first DCI format, and
the pseudo random sequence is initialized based on a physical cell identity, in a case that the PUSCH is scheduled by using a second DCI format.

6. A communication method of a base station device comprising:
transmitting, to a terminal device, by using a radio resource control (RRC) more than one values of parameters related to an initialization of a pseudo random sequence for generation of a sequence of a demodulation reference signal (DMRS) associated with transmission of a physical uplink shared channel (PUSCH); and
receiving, from the base station device, the DMRS associated with the transmission of the PUSCH, the sequence of the DMRS associated with the transmission of the PUSCH being given by using the pseudo random sequence, wherein
the pseudo random sequence is initialized based on a value of a parameter, in a case that the PUSCH is scheduled by using a first downlink control information (DCI) format, the value of the parameter being indicated from the more than one values of the parameters by using downlink control information included in the first DCI format, and
the pseudo random sequence is initialized based on a physical cell identity, in a case that the PUSCH is scheduled by using a second DCI format.

* * * * *